US011052311B2

(12) United States Patent
Bleasdale-Shepherd et al.

(10) Patent No.: US 11,052,311 B2
(45) Date of Patent: Jul. 6, 2021

(54) MACHINE-LEARNED TRUST SCORING BASED ON SENSOR DATA

(71) Applicant: Valve Corporation, Bellevue, WA (US)

(72) Inventors: Iestyn Bleasdale-Shepherd, Bellevue, WA (US); Scott Dalton, Seattle, WA (US); Richard Kaethler, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/663,041

(22) Filed: Oct. 24, 2019

(65) Prior Publication Data

US 2021/0038979 A1    Feb. 11, 2021

Related U.S. Application Data

(63) Continuation-in-part of application No. 16/125,224, filed on Sep. 7, 2018, now Pat. No. 10,905,962.

(51) Int. Cl.
*A63F 13/30* (2014.01)
*A63F 13/79* (2014.01)
(Continued)

(52) U.S. Cl.
CPC .............. *A63F 13/30* (2014.09); *A63F 13/79* (2014.09); *A63F 13/85* (2014.09); *G07F 17/3216* (2013.01); *G07F 17/3225* (2013.01)

(58) Field of Classification Search
None
See application file for complete search history.

(56) References Cited

U.S. PATENT DOCUMENTS 7,169,050 B1 * 1/2007 Tyler ...................... A63F 13/12
463/42
8,221,238 B1    7/2012 Shaw et al.
(Continued)

OTHER PUBLICATIONS

Non Final Office Action dated Nov. 12, 2019 for U.S. Appl. No. 16/125,224 "Machine-Learned Trust Scoring for Slayer Matchmaking" Kaethler, 10 pages.
(Continued)

*Primary Examiner* — Seng H Lim
(74) *Attorney, Agent, or Firm* — Lee & Hayes, P.C.

(57) ABSTRACT

A trained machine learning model(s) is used to determine scores (e.g., trust scores) for user accounts registered with a video game service, and the scores are used to match players together in multiplayer video game settings. For example, sensor data received from client machines can be provided as input to the trained machine learning model(s), and the trained machine learning model(s) generates scores as output, which relate to probabilities that the game control data received from those client machines was generated by handheld devices, as opposed to having been synthesized and/or modified using software. In this manner, subsets of logged-in user accounts executing a video game can be assigned to different matches (e.g., by isolating non-human players from human players) based at least in part on the scores determined for those logged-in user accounts, and the video game is executed in the assigned match for each logged-in user account.

20 Claims, 9 Drawing Sheets

(51) Int. Cl.
*A63F 13/85* (2014.01)
*G07F 17/32* (2006.01)

(56) References Cited

U.S. PATENT DOCUMENTS

| | | | |
|---|---|---|---|
| 8,984,151 B1 | 3/2015 | Hsieh et al. | |
| 9,180,362 B2 | 11/2015 | Herrman et al. | |
| 9,246,923 B1 | 1/2016 | Terribilini et al. | |
| 9,694,286 B2 | 7/2017 | Khabazian | |
| 10,207,189 B1 * | 2/2019 | Gauffin | A63F 13/79 |
| 10,357,713 B1 | 7/2019 | Landers et al. | |
| 2002/0187828 A1 * | 12/2002 | Benbrahim | G07F 17/323 463/29 |
| 2004/0097287 A1 | 5/2004 | Postrel | |
| 2006/0121990 A1 | 6/2006 | O'Kelley, II et al. | |
| 2006/0247055 A1 | 11/2006 | O'Kelley, II et al. | |
| 2006/0287096 A1 | 12/2006 | O'Kelley, II et al. | |
| 2007/0105624 A1 * | 5/2007 | Tyler | A63F 13/79 463/29 |
| 2009/0325709 A1 | 12/2009 | Shi | |
| 2010/0323794 A1 * | 12/2010 | Su | A63F 13/212 463/36 |
| 2011/0105221 A1 | 5/2011 | Sotoike | |
| 2011/0320823 A1 * | 12/2011 | Saroiu | H04L 9/3218 713/189 |
| 2012/0142429 A1 | 6/2012 | Muller | |
| 2012/0236103 A1 | 9/2012 | Cahill et al. | |
| 2013/0090750 A1 | 4/2013 | Herrman et al. | |
| 2013/0123003 A1 | 5/2013 | Williams et al. | |
| 2013/0227700 A1 | 8/2013 | Dhillon et al. | |
| 2013/0296039 A1 | 11/2013 | Engineer et al. | |
| 2014/0025732 A1 | 1/2014 | Lin et al. | |
| 2014/0258305 A1 * | 9/2014 | Kapadia | H04W 4/21 707/741 |
| 2014/0280095 A1 | 9/2014 | Friedman et al. | |
| 2015/0238866 A1 | 8/2015 | Khabazian | |
| 2015/0339583 A1 | 11/2015 | McQueen et al. | |
| 2016/0001181 A1 | 1/2016 | Marr et al. | |
| 2016/0005270 A1 | 1/2016 | Marr et al. | |
| 2016/0170969 A1 | 6/2016 | Allen et al. | |
| 2017/0193845 A1 * | 7/2017 | Cardonha | G09B 5/02 |
| 2017/0225079 A1 | 8/2017 | Conti et al. | |
| 2017/0236370 A1 | 8/2017 | Wang | |
| 2017/0259178 A1 | 9/2017 | Aghdaie et al. | |
| 2017/0294075 A1 | 10/2017 | Frenkel et al. | |
| 2018/0068108 A1 * | 3/2018 | Fish | H04W 12/06 |
| 2018/0111051 A1 | 4/2018 | Xue et al. | |
| 2018/0182208 A1 | 6/2018 | Liu et al. | |
| 2018/0359302 A1 | 12/2018 | Gong et al. | |
| 2019/0095600 A1 | 3/2019 | Chan et al. | |
| 2019/0095601 A1 | 3/2019 | Chan et al. | |
| 2020/0061472 A1 * | 2/2020 | Jacoby | G07F 17/3227 |
| 2020/0078688 A1 | 3/2020 | Kaethler et al. | |
| 2020/0184084 A1 * | 6/2020 | Shockley | G06F 21/62 |
| 2020/0311734 A1 * | 10/2020 | Mardikar | H04L 9/3239 |

OTHER PUBLICATIONS

PCT Search Report and Written Opinion dated Nov. 15, 2019 for PCT application No. PCT/US19/50045>, 13 pages.

Final Office Action dated Mar. 12, 2020 for U.S. Appl. No. 16/125,224 "Machine-Learned Trust Scoring for Player Matchmaking", Kaethler, 14 pages.

Office Action for U.S. Appl. No. 16/125,224, dated Jul. 2, 2020, Kaethler, "Machine-Learned Trust Scoring for Player Matchmaking", 13 Pages.

PCT Search Report and Written Opinion dated Nov. 16, 2020 for PCT application No. PCT/US20/56920, 10 pages.

* cited by examiner

MACHINE-LEARNED TRUST SCORING BASED ON SENSOR DATA

CROSS REFERENCE TO RELATED APPLICATION

This application claims priority under 35 U.S.C. § 120 as a continuation-in-part to pending U.S. patent application Ser. No. 16/125,224 filed on Sep. 7, 2018, entitled "MACHINE-LEARNED TRUST SCORING FOR PLAYER MATCHMAKING." application Ser. No. 16/125,224 is incorporated herein by reference in its entirety.

BACKGROUND

The constant, or nearly constant, availability of wide area network communications, in combination with increasing capabilities of client machines, has caused a rise in popularity of online multiplayer video games. In these multiplayer video games, a video game service may use a matchmaking system to match players together in groups so that grouped players can play the video game together in multiplayer mode. One popular video game genre where players often play in multiplayer mode is the first-person shooter genre. In this example genre, two or more teams of players can compete in multiple rounds with the goal of winning enough rounds to win a match. Players on the same team may work together to accomplish an objective, while competing against players of an opposing team.

Although the vast majority of video game players do not engage in cheating behavior, there is often a small population of players who cheat in order to gain an advantage over other players. Often, cheating players employ third party software that provides them with some informational or mechanical advantage over other players. For example, third party software may be configured to extract location data about the locations of other players and may present these locations to the cheating player. This informational advantage allows the cheating player to ambush the other players, or otherwise exploit the location information revealed by third party software. A more conspicuous manner of cheating is to use third party software that is able to detect another player's location and automate the motions of the cheater's avatar (e.g., by programmatically moving a mouse cursor to the targeted player and firing a weapon in an automated fashion). In other words, some players cheat by having third party software play the video game on their behalf, using computerized algorithms that enhance the cheating player's performance from a mechanical perspective.

In general, bad player behavior, such as cheating, ruins the gameplay experience for players who want to play the game legitimately. Thus, if a player who intends to engage in bad behavior is matched with other players who exhibit good behavior, the multiplayer video game experience is ruined for the good-behaving players. Systems in use today that attempt to identify players who are likely to engage in future bad behavior are somewhat inaccurate in their predictions. These systems are also largely static in the sense that they are based on statically-defined rules and inputs, which means that they must be manually-adjusted to change the system's outputs. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
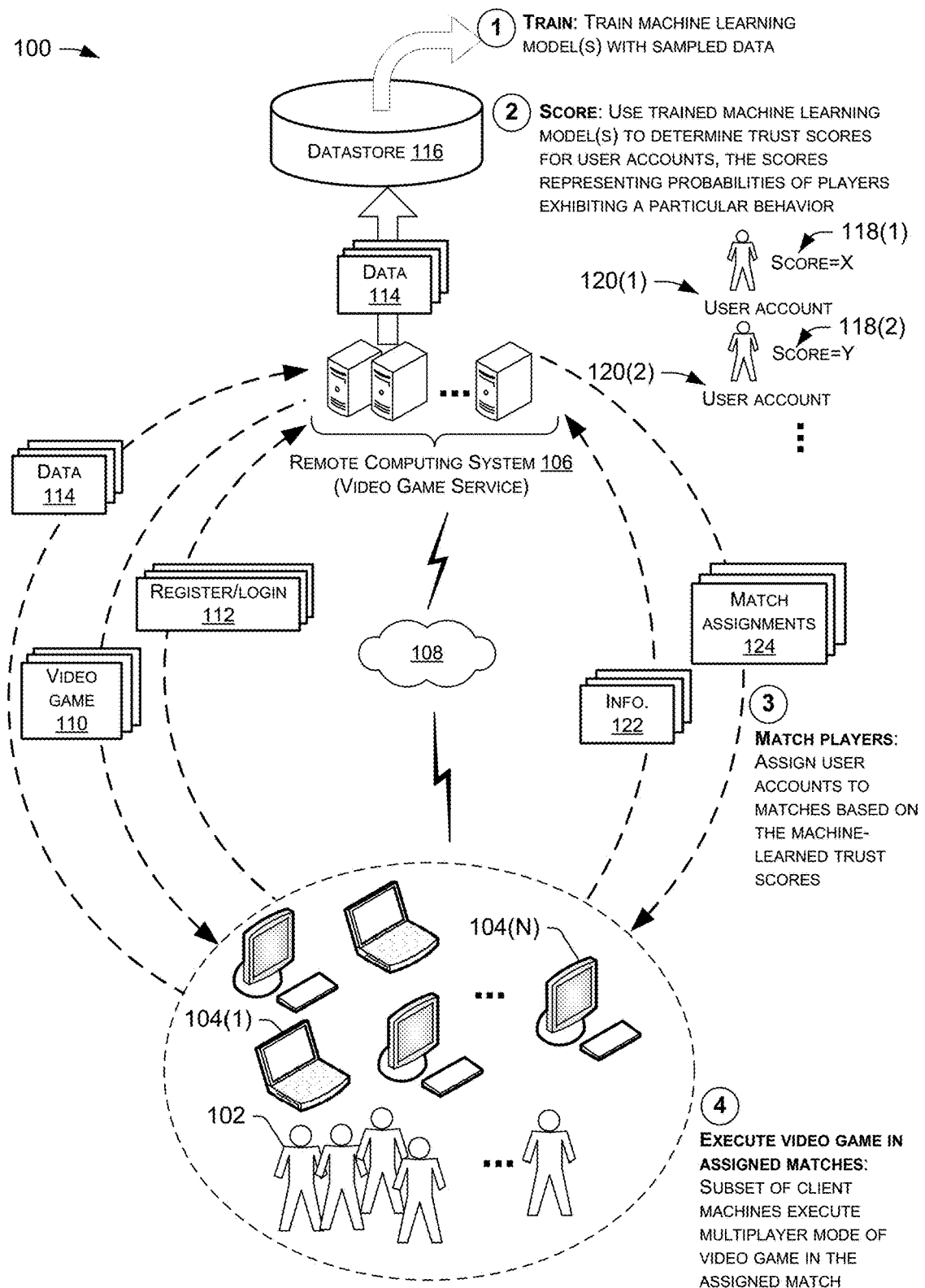
FIG. 1 is a diagram illustrating an example environment that includes a remote computing system configured to train and use a machine learning model(s) to determine trust scores relating to the likely behavior of a player(s), and to match players together based on the machine-learned trust scores.

Described herein are, among other things, techniques, devices, and systems for generating trust scores using a machine learning approach, and thereafter using the machine-learned trust scores to match players together in multiplayer video game settings. The disclosed techniques may be implemented, at least in part, by a remote computing system that distributes video games (and content thereof) to client machines of a user community as part of a video game service. These client machines may individually install a client application that is configured to execute video games received (e.g., downloaded, streamed, etc.) from the remote computing system. This video game platform enables registered users of the community to play video games as "players." For example, a user can load the client application, login with a registered user account, select a desired video game, and execute the video game on his/her client machine via the client application.

Whenever the above-mentioned users access and use this video game platform, data may be collected by the remote computing system, and this data can be maintained by the remote computing system in association with registered user accounts. Over time, one can appreciate that a large collection of historical data tied to registered user accounts may be available to the remote computing system. The remote computing system can then train one or more machine learning models using a portion of the historical data as training data. For instance, a portion of the historical data associated with a sampled set of user accounts can be represented by a set of features and labeled to indicate players who have behaved in a particular way in the past while playing a video game(s). A machine learning model(s) trained on this data is able to predict player behavior by outputting machine-learned scores (e.g., trust scores) for user accounts that are registered with the video game service. These machine-learned scores are usable for player matchmaking so that players who are likely to behave, or not behave, in accordance with a particular behavior can be grouped together in a multiplayer video game setting.

In an example process, a computing system may determine scores (e.g., trust scores) for a plurality of user accounts registered with a video game service. An individual score may be determined by accessing data associated with an individual user account, providing the data as input to a trained machine learning model(s), and generating, as output from the trained machine learning model, a score associated with the individual user account. The score relates to a probability of a player associated with the individual user account behaving, or not behaving, in accordance with a particular behavior while playing one or more video games in a multiplayer mode. Thereafter, the computing system may receive information from a plurality of client machines, the information indicating logged-in user accounts that are logged into a client application executing a video game, and the computing system may define multiple matches into which players are to be grouped for playing the video game in the multiplayer mode. These multiple matches may comprise at least a first match and a second match. The computing system may assign a first subset of the logged-in user accounts to the first match and a second subset of the logged-in user accounts to the second match based at least in part on the scores determined for the logged-in user accounts, and may cause a first subset of the client machines associated with the first subset of the logged-in user accounts to execute the video game in the first match, while causing a second subset of the client machines associated with the second subset of the logged-in user accounts to execute the video game in the second match.

Because human players who want to play a video game legitimately often utilize handheld devices (e.g., handheld game controllers) to play video games, and because software configured to synthesize and/or modify game control data for purposes of cheating does not use a handheld device to generate the synthesized and/or modified game control data, sensor data associated with one or more sensors of a handheld device can be leveraged using machine-learned scoring in order to distinguish legitimate human players from software that is programmed to cheat so that players using software to cheat can be isolated from legitimate human players. Accordingly, described herein are techniques, devices, and systems for receiving game control data and sensor data from one or more client machines that are interacting with the video game platform, and providing at least the sensor data as input to a trained machine learning model(s) to generate a trust score(s) associated with a user account(s). The trust score, in this instance, may relate to a probability that the game control data received from a given client machine was generated by a handheld device associated with the given client machine. Accordingly, the trust score(s) may be utilized for player matchmaking in order to mitigate instances where a non-human player (e.g., software designed for cheating) is matched with a human player who wants to play a video game legitimately with one or more other human players.

To illustrate, whenever users play video games via the video game platform, they may use handheld devices, such as handheld game controllers, to control an aspect(s) of the video game. A given handheld device may include one or more sensors, such as, without limitation, a gyroscope(s), an accelerometer(s), and/or a touch sensor(s), among other possible sensors. A touch sensor(s) (e.g., a capacitive pad(s)), for example, may be disposed underneath or on a surface of the device, and/or within or on a finger-operated control. This touch sensor(s) may be configured to detect proximity of a finger(s) to the surface or to the finger-operated control, and, in response, the touch sensor(s) may generate sensor data indicative of the proximity of the finger(s) to the touch sensor(s). As another example, a gyroscope(s) and/or accelerometer(s) mounted in the housing of the handheld device may detect movement of the handheld device in different directions (e.g., moving—such as by translational, rotational, and/or tilting movement), and, in response, the gyroscope(s) and/or accelerometer(s) may generate sensor data indicative of a characteristic(s) of this movement. In general, the sensor data can be utilized for various purposes, such as to control an aspect(s) of a video game (e.g., to control a player-controlled character, to rotate a virtual camera that dictates what is visible on the display, etc.). When the sensor data is used as game control data in this manner, the sensor data may, in some cases, be altered (e.g., filtered/dampened, amplified, etc.) before it is used to control the aspect(s) of the video game. However, the techniques and systems described herein are directed to a handheld device configured to send raw, unfiltered sensor data generated by one or more sensors of the handheld device to the remote computing system (e.g., by sending the sensor data via an associated client machine). This raw sensor data may be sent along with the game control data (e.g., data generated by button presses, deflections of joysticks, etc., as well as altered sensor data) that is to be processed for controlling an aspect of the video game.

Over time, as users interact with the video game platform using handheld devices with one or more sensors, as described above and elsewhere herein, a large collection of historical sensor data and game control data can be associated with registered user accounts and used to train a machine learning model(s). For example, the remote computing system can train one or more machine learning models using a portion of the historical sensor data as training data. For instance, a portion of the historical sensor data associated with a sampled set of user accounts can be represented by a set of features and each user account in the sampled set can be labeled to indicate whether the historical game control data associated with the user accounts was generated by a real, handheld device while a human player held and operated the handheld device to generate the game control data. A machine learning model(s) trained on this sensor data is able to determine whether game control data associated with a particular user account was generated by a physical, handheld device, as opposed to having been synthesized and/or modified by software. In this manner, the machine learning model(s) can detect cheating behavior based on sensor data provided as input to the machine learning model(s). For example, when a human operates a handheld device, such as a handheld game controller, there may be nuanced movements of the handheld device that are unintentional movements, yet the nuanced movements may be exhibited in the sensor data generated by one or more physical sensors (e.g., a touch sensor(s), a gyroscope(s), and/or an accelerometer(s), etc.) of the handheld device. The machine learning model(s) may be trained with at least this sensor data as training data in order to distinguish between human players and non-human players. For instance, by recognizing subtle nuances in new sensor data received from a client machine, the machine learning model(s) can output a trust score indicative of corresponding game control data having been generated by a physical sensor(s) of a real, handheld device, such as a device that was mechanically operated (e.g., by a human user). Conversely, by failing to receive sensor data from another client machine, or failing to recognize subtle nuances in sensor data received from the other client machine that are expected to be exhibited in the sensor data, the machine learning model(s) can output a trust score indicative of corresponding game control data having been synthesized and/or modified using software, such as game control data synthesized and/or modified by a so-called "aimbot" that programmatically generates game control data to aim and fire a weapon of a player-controlled character in an automated fashion, and without human intervention. As such, using the machine-learned scores for player matchmaking can help avoid matching human players—who wish to play a video game legitimately—with non-human players, such as software designed to cheat in the multiplayer mode of the video game.

In an example process, a computing system may receive game control data and sensor data from a client machine, and may determine a score (e.g., a trust score) for a user account that is associated with the received data, and which is registered with a video game service. For example, the computing system may provide the received sensor data as input to a trained machine learning model(s), and generate, as output from the trained machine learning model(s), the score associated with the user account. The score relates to a probability of the received game control data having been generated by a handheld device associated with the client machine. Based on the score, the computing system may assign the user account to an assigned match, of multiple matches, comprising at least one of a first match designated for human players or a second match designated for non-human players. Accordingly, the video game can be executed for the user account in the assigned match.

The techniques and systems described herein may provide an improved gaming experience for users who desire to play a video game in multiplayer mode in the manner it was meant to be played. This is because the techniques and systems described herein are able to match together players (including non-human players, like "aimbots") who are likely to behave badly (e.g., cheat), and to isolate those players from other trusted players who are likely to play the video game legitimately. For example, the trained machine learning model(s) can learn to predict which players are likely to cheat, and which players are unlikely to cheat by attributing corresponding trust scores to the user accounts that are indicative of each player's propensity to cheating (or not cheating). In this manner, players with low (e.g., below threshold) trust scores may be matched together, and may be isolated from other players whose user accounts were attributed high (e.g., above threshold) trust scores, leaving the trusted players to play in a match without any players who are likely to cheat. Although the use of a threshold score is described as one example way of providing match assignments, other techniques are contemplated, such as clustering algorithms, or other statistical approaches that use the trust scores to preferentially match user accounts (players) with "similar" trust scores together (e.g., based on a similarity metric, such as a distance metric, a variance metric, etc.).

The techniques and systems described herein also improve upon existing matchmaking technology, which uses static rules to determine the trust levels of users. A machine-learning model(s), however, can learn to identify complex relationships of player behaviors to better predict player behavior, which is not possible with static rules-based approaches. Thus, the techniques and systems described herein allow for generating trust scores that more accurately predict player behavior, as compared to existing trust systems, leading to lower false positive rates and fewer instances of players being attributed an inaccurate trust score. The techniques and systems described herein are also more adaptive to changing dynamics of player behavior than existing systems because a machine learning model(s) is/are retrainable with new data in order to adapt the machine learning model(s) understanding of player behavior over time, as player behavior changes. The techniques and systems described herein may further allow one or more devices to conserve resources with respect to processing resources, memory resources, networking resources, etc., in the various ways described herein.

It is to be appreciated that, although many of the examples described herein reference "cheating" as a targeted behavior by which players can be scored and grouped for matchmaking purposes, the techniques and systems described herein may be configured to identify any type of behavior (good or bad) using a machine-learned scoring approach, and to predict the likelihood of players engaging in that behavior for purposes of player matchmaking. Thus, the techniques and systems may extend beyond the notion of "trust" scoring in the context of bad behavior, like cheating, and may more broadly attribute scores to user accounts that are indicative of a compatibility or an affinity between players.

FIG. 1 is a diagram illustrating an example environment 100 that includes a remote computing system configured to train and use a machine learning model(s) to determine trust scores relating to the likely behavior of a player(s), and to match players together based on the machine-learned trust scores. A community of users 102 may be associated with one or more client machines 104. The client machines 104(1)-(N) shown in FIG. 1 represent computing devices that can be utilized by users 102 to execute programs, such as video games, thereon. Because of this, the users 102 shown in FIG. 1 are sometimes referred to as "players" 102, and these names can be used interchangeably herein to refer to human operators of the client machines 104. The client machines 104 can be implemented as any suitable type of computing device configured to execute video games and to render graphics on an associated display, including, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device. Furthermore, the client machines 104 may vary in terms of their respective platforms (e.g., hardware and software). For example, the plurality of client machines 104 shown in FIG. 1 may represent different types of client machines 104 with varying capabilities in terms of processing capabilities (e.g., central processing unit (CPU) models, graphics processing unit (GPU) models, etc.), graphics driver versions, and the like.

The client machines 104 may communicate with a remote computing system 106 (sometimes shortened herein to "computing system 106," or "remote system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth.

In some embodiments, the computing system 106 acts as, or has access to, a video game platform that implements a video game service to distribute (e.g., download, stream, etc.) video games 110 (and content thereof) to the client machines 104. In an example, the client machines 104 may each install a client application thereon. The installed client application may be a video game client (e.g., gaming software to play video games 110). A client machine 104 with an installed client application may be configured to download, stream, or otherwise receive programs (e.g., video games 110, and content thereof) from the computing system 106 over the computer network 108. Any type of content-distribution model can be utilized for this purpose, such as a direct purchase model where programs (e.g., video games 110) are individually purchasable for download and execution on a client machine 104, a subscription-based model, a content-distribution model where programs are rented or leased for a period of time, streamed, or otherwise made available to the client machines 104. Accordingly, an individual client machine 104 may include one or more installed video games 110 that are executable by loading the client application.

As shown by reference numeral 112 of FIG. 1, the client machines 104 may be used to register with, and thereafter login to, a video game service. A user 102 may create a user account for this purpose and specify/set credentials (e.g., passwords, PINs, biometric IDs, etc.) tied to the registered user account. As a plurality of users 102 interact with the video game platform (e.g., by accessing their user/player profiles with a registered user account, playing video games 110 on their respective client machines 104, etc.), the client machines 104 send data 114 to the remote computing system 106. The data 114 sent to the remote computing system 106, for a given client machine 104, may include, without limitation, user input data, video game data (e.g., game performance statistics uploaded to the remote system), social networking messages and related activity, identifiers (IDs) of the video games 110 played on the client machine 104, and so on. This data 114 can be streamed in real-time (or substantially real-time), sent the remote system 106 at defined intervals, and/or uploaded in response to events (e.g., exiting a video game).

FIG. 1 shows that the computing system 106 may store the data 114 it collects from the client machines 104 in a datastore 116, which may represent a data repository maintained by, and accessible to, the remote computing system 106. The data 114 may be organized within the datastore 116 in any suitable manner to associate user accounts with relevant portions of the data 114 relating to those user accounts. Over time, given a large community of users 102 that frequently interact with the video game platform, sometimes for long periods of time during a given session, a large amount of data 114 can be collected and maintained in the datastore 116.

At Step 1 in FIG. 1, the computing system 106 may train a machine learning model(s) using historical data 114 sampled from the datastore 116. For example, the computing system 106 may access a portion of the historical data 114 associated with a sampled set of user accounts registered with the video game service, and use the sampled data 114 to train the machine learning model(s). In some embodiments, the portion of the data 114 used as training data is represented by a set of features, and each user account of the sampled set is labeled with a label that indicates whether the user account is associated with a player who has behaved in accordance with the particular behavior while playing at least one video game in the past. For example, if a player with a particular user account has been banned by the video game service in the past for cheating, this "ban" can be used as one of multiple class labels for the particular user account. In this manner, a supervised learning approach can be taken to train the machine learning model(s) to predict players who are likely to cheat in the future.

At Step 2, the computing system 106 may score a plurality of registered user accounts using the trained machine learning model(s). For example, the computing system 106 may access, from the datastore 116, data 114 associated with a plurality of registered user accounts, provide the data 114 as input to the trained machine learning model(s), and generate, as output from the trained machine learning model(s), scores associated with the plurality of user accounts. These scores (sometimes referred to herein as "trust scores," or "trust factors") relate to the probabilities of players associated with the plurality of user accounts behaving, or not behaving, in accordance with the particular behavior while playing one or more video games in a multiplayer mode. In the case of "bad" behavior, such as cheating, the trust score may relate to the probability of a player not cheating. In this case, a high trust score indicates a trusted user account, whereas a low trust score indicates an untrusted user account, which may be used as an indicator of a player who is likely to exhibit the bad behavior, such as cheating. In some embodiments, the score is a variable that is normalized in the range of [0,1]. This trust score may have a monotonic relationship with a probability of a player behaving (or not behaving, as the case may be) in accordance with the particular behavior while playing a video game 110. The relationship between the score and the actual probability associated with the particular behavior, while monotonic, may or may not be a linear relationship. Of course, the scoring can be implemented in any suitable manner to predict whether a player tied to the user account will, or will not, behave in a particular way. FIG. 1 illustrates a plurality of user accounts 120 that have been scored according to the techniques described herein. For example, a first score 118(1) (score=X) is attributed to a first user account 120(1), a second score 118(2) (score=Y) is attributed to a second user account 120(2), and so on and so forth, for any suitable number of registered user accounts 120.

With the machine-learned scores 118 determined for a plurality of registered user accounts 120, the computing system 106 may be configured to match players together in multiplayer video game settings based at least in part on the machine-learned scores 118. For instance, FIG. 1 shows that the computing system 106 may receive information 122 from a plurality of the client machines 104 that have started execution of a video game 110. This information 122 may indicate, to the computing system 106, that a set of logged-in user accounts 120 are currently executing a video game 110 on each client machine 104 via the installed client application. In other words, as players 102 login with their user accounts 120 and start to execute a particular video game 110, requesting to play in multiplayer mode, their respective client machines 104 may provide information 122 to the computing system 106 indicating as much.

At Step 3, the computing system 106, in response to receiving this information 122 from the client machines 104, may match players 102 together by defining multiple matches into which players 102 are to be grouped for playing the video game 110 in the multiplayer mode, and by providing match assignments 124 to the client machines 104 in order to assign subsets of the logged-in user accounts 120 to different ones of the multiple matches based at least in part on the machine-learned scores 118 that were determined for the logged-in user accounts 120. In this manner, if the trained machine learning model(s) assigned low (e.g., below threshold) scores 118 to a first subset of the logged-in user accounts 120 and high (e.g., above threshold) scores 118 to a second subset of the logged-in user accounts 120, the first subset of the logged-in user accounts 120 may be assigned to a first match of the multiple matches, and the second subset of the logged-in user accounts 120 may be assigned to a second, different match of the multiple matches. In this manner, a subset of players 102 with similar scores 118 may be grouped together and may remain isolated from other players with scores 118 that are dissimilar from the subset of players' 102 scores 118.

At Step 4, the client applications on each machine 104 executing the video game 110 may execute the video game 110 in the assigned match the logged-in user account 120 in question. For example, a first subset of client machines 104 may be associated with a first subset of the logged-in user accounts 120 that were assigned to the first match, and this first subset of client machines 104 may execute the video game 110 in the first match, while a second subset of client machines 104—associated with the second subset of the logged-in user accounts 120 assigned to the second match— may execute the video game 110 in the second match. With players grouped into matches based at least in part on the machine-learned scores 118, the in-game experience may be improved for at least some of the groups of players 102 because the system may group players predicted to behave badly (e.g., by cheating) together in the same match, and by doing so, may keep the bad-behaving players isolated from other players who want to play the video game 110 legitimately.

Figure 2:
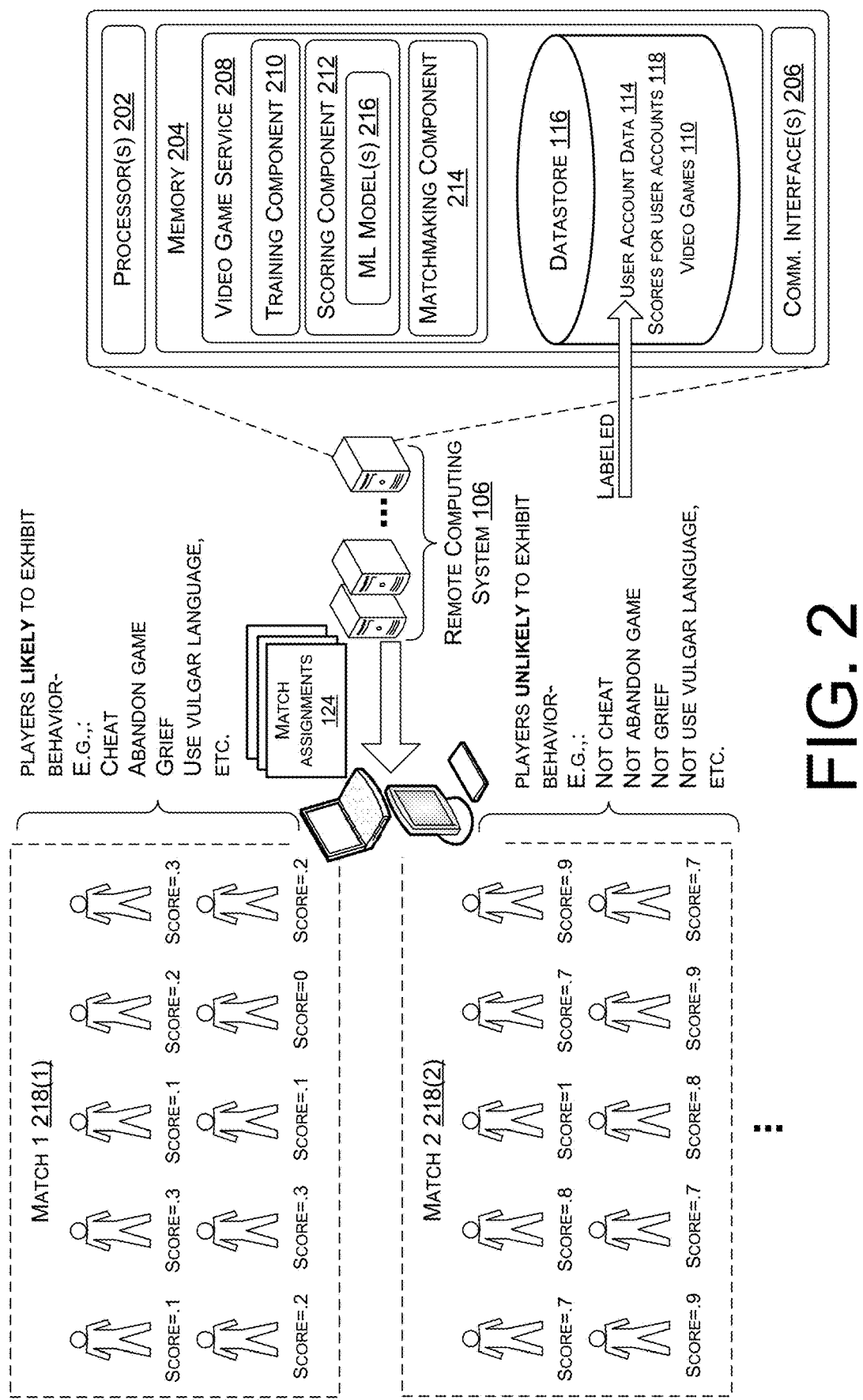
FIG. 2 shows a block diagram illustrating example components of the remote computing system of FIG. 1, as well as a diagram illustrating how machine-learned trust scoring can be used for player matchmaking.

FIG. 2 shows a block diagram illustrating example components of the remote computing system 106 of FIG. 1, as well as a diagram illustrating how machine-learned trust scoring can be used for player matchmaking. In the illustrated implementation, the computing system 106 includes, among other components, one or more processors 202 (e.g., a central processing unit(s) (CPU(s))), memory 204 (or non-transitory computer-readable media 204), and a communications interface(s) 206. The memory 204 (or non-transitory computer-readable media 204) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 204 may be implemented as computer-readable storage media ("CRSM"), which may be any available physical media accessible by the processor(s) 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 202. A video game service 208 may represent instructions stored in the memory 204 that, when executed by the processor(s) 202, cause the computing system 106 to perform the techniques and operations described herein.

For example, the video game service 208 may include a training component 210, a scoring component 212, and a matchmaking component 214, among other possible components. The training component 210 may be configured to train a machine learning model(s) using a portion of the data 114 in the datastore 116 that is associated with a sampled set of user accounts 120 as training data to obtain a trained machine learning model(s) 216. The trained machine learning model(s) 216 is usable by the scoring component 212 to determine scores 118 (e.g., trust scores 118) for a plurality of registered user accounts 120. The matchmaking component 214 provides match assignments 124 based at least in part on the machine-learned scores 118 so that players are grouped into different ones of multiple matches 218 (e.g., a first match 218(1), a second match 218(2), etc.) for playing a video game 110 in the multiplayer mode. FIG. 2 shows how a first group of players 102 (e.g., ten players 102) associated with a first subset of logged-in user accounts 120 may be assigned to a first match 218(1), and a second group of players 102 (e.g., another ten players 102) associated with a second subset of logged-in user accounts 120 are assigned to a second match 218(2). Of course, any number of matches 218 may be defined, which may depend on the number of logged-in user accounts 120 that request to execute the video game 110 in multiplayer mode, a capacity limit of network traffic that the computing system 106 can handle, and/or other factors. In some embodiments, other factors (e.g., skill level, geographic region, etc.) are considered in the matchmaking process, which may cause further breakdowns and/or subdivisions of players into a fewer or greater number of matches 218.

As mentioned, the scores 118 determined by the scoring component 212 (e.g., output by the trained machine learning model(s) 216) are machine-learned scores 118. Machine learning generally involves processing a set of examples (called "training data") in order to train a machine learning model(s). A machine learning model(s) 216, once trained, is a learned mechanism that can receive new data as input and estimate or predict a result as output. For example, a trained machine learning model 216 can comprise a classifier that is tasked with classifying unknown input (e.g., an unknown image) as one of multiple class labels (e.g., labeling the image as a cat or a dog). In some cases, a trained machine learning model 216 is configured to implement a multi-label classification task (e.g., labeling images as "cat," "dog,"

"duck," "penguin," and so on). Additionally, or alternatively, a trained machine learning model 216 can be trained to infer a probability, or a set of probabilities, for a classification task based on unknown data received as input. In the context of the present disclosure, the unknown input may be data 114 that is associated with an individual user account 120 registered with the video game service, and the trained machine learning model(s) 216 may be tasked with outputting a score 118 (e.g., a trust score 118) that indicates, or otherwise relates to, a probability of the individual user account 120 being in one of multiple classes. For instance, the score 118 may relate to a probability of a player 102 associated with the individual user account 120 behaving (or not behaving, as the case may be) in accordance with a particular behavior while playing a video game 110 in a multiplayer mode. In some embodiments, the score 118 is a variable that is normalized in the range of [0,1]. This trust score 118 may have a monotonic relationship with a probability of a player 102 behaving (or not behaving, as the case may be) in accordance with the particular behavior while playing a video game 110. The relationship between the score 118 and the actual probability associated with the particular behavior, while monotonic, may or may not be a linear relationship. In some embodiments, the trained machine learning model(s) 216 may output a set of probabilities (e.g., two probabilities), or scores relating thereto, where one probability (or score) relates to the probability of the player 102 behaving in accordance with the particular behavior, and the other probability (or score) relates to the probability of the player 102 not behaving in accordance with the particular behavior. The score 118 that is output by the trained machine learning model(s) 216 can relate to either of these probabilities in order to guide the matchmaking processes. In an illustrative example, the particular behavior may be cheating. In this example, the score 118 that is output by the trained machine learning model(s) 216 relates to a likelihood that the player 102 associated with the individual user account 120 will, or will not, go on to cheat during the course of playing a video game 110 in multiplayer mode. Thus, the score 118 can, in some embodiments, indicate a level of trustworthiness of the player 102 associated with the individual user account 120, and this is why the score 118 described herein is sometimes referred to as a "trust score" 118.

The trained machine learning model(s) 216 may represent a single model or an ensemble of base-level machine learning models, and may be implemented as any type of machine learning model 216. For example, suitable machine learning models 216 for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 216 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train the machine learning model 216 may include various types of data 114. In general, training data for machine learning can include two components: features and labels. However, the training data used to train the machine learning model(s) 216 may be unlabeled, in some embodiments. Accordingly, the machine learning model(s) 216 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. The following is a list of example features that can be included in the training data for training the machine learning model(s) 216 described herein. However, it is to be appreciated that the following list of features is non-exhaustive, and features used in training may include additional features not described herein, and, in some cases, some, but not all, of the features listed herein. Example features included in the training data may include, without limitation, an amount of time a player spent playing video games 110 in general, an amount of time a player spent playing a particular video game 110, times of the day the player was logged in and playing video games 110, match history data for a player—e.g., total score (per match, per round, etc.), headshot percentage, kill count, death count, assist count, player rank, etc., a number and/or frequency of reports of a player cheating, a number and/or frequency of cheating acquittals for a player, a number and/or frequency of cheating convictions for a player, confidence values (score) output by a machine learning model that detected a cheating player during a video game, a number of user accounts 120 associated with a single player (which may be deduced from a common address, phone number, payment instrument, etc. tied to multiple user accounts 120), how long a user account 120 has been registered with the video game service, a number of previously-banned user accounts 120 tied to a player, number and/or frequency of a player's monetary transactions on the video game platform, a dollar amount per transaction, a number of digital items of monetary value associated with a player's user account 120, number of times a user account 120 has changed hands (e.g., been transfers between different owners/players), a frequency at which a user account 120 is transferred between players, geographic locations from which a player has logged-in to the video game service, a number of different payment instruments, phone numbers, mailing addresses, etc. that have been associated with a user account 120 and/or how often these items have been changed, and/or any other suitable features that may be relevant in computing a trust score 118 that is indicative of a player's propensity to engage in a particular behavior. As part of the training process, the training component 210 may set weights for machine learning. These weights may apply to a set of features included in the training data, as derived from the historical data 114 in the datastore 116. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the score 118 that is output by the trained machine learning model 216.

In regards to cheating in particular—which is an illustrative example of a type of behavior that can be used as a basis for matching players, there may be behaviors associated with a user account 120 of a player who is planning on cheating in a video game 110 that are unlike behaviors associated with a user account 120 of a non-cheater. Thus, the machine learning model 216 may learn to identify those behavioral patterns from the training data so that players who are likely to cheat can be identified with high confidence and scored appropriately. It is to be appreciated that there may be outliers in the ecosystem that the system can be configured to protect based on some known information about the outliers. For example, professional players may exhibit different behavior than average players exhibit, and these professional players may be at risk of being scored incorrectly. As another example, employees of the service provider of the video game service may login with user accounts for investigation purposes or quality control purposes, and may behave in ways that are unlike the average player's behavior. These types of players/users 102 can be treated as outliers and proactively assigned a score 118, outside of the machine learning context, that attributes a high trust to those players/users 102. In this manner, well-known professional players, employees of the service provider, and the like, can be assigned an authoritative score 118 that is not modifiable by the scoring component 212 to avoid having those players/users 102 matched with bad-behaving players.

The training data may also be labeled for a supervised learning approach. Again, using cheating as an example type of behavior that can be used to match players together, the labels in this example may indicate whether a user account 120 was banned from playing a video game 110 via the video game service. The data 114 in the datastore 116 may include some data 114 associated with players who have been banned cheating, and some data 114 associated with players who have not been banned for cheating. An example of this type of ban is a Valve Anti-Cheat (VAC) ban utilized by Valve Corporation of Bellevue, Wash. For instance, the computing system 106, and/or authorized users of the computing system 106, may be able to detect when unauthorized third party software has been used to cheat. In these cases, after going through a rigorous verification process to make sure that the determination is correct, the cheating user account 120 may be banned by flagging it as banned in the datastore 116. Thus, the status of a user account 120 in terms of whether it has been banned, or not banned, can be used as positive, and negative, training examples.

It is to be appreciated that past player behavior, such as past cheating, can be indicated in other ways. For example, a mechanism can be provided for users 102, or even separate machine learning models, to detect and report players for suspected cheating. These reported players may be put before a jury of their peers who review the game playback of the reported player and render a verdict (e.g., cheating or no cheating). If enough other players decide that the reported player's behavior amounts to cheating, a high confidence threshold may be reached and the reported player is convicted of cheating and receives a ban on their user account 120, which can also constitute a label for the associated training data.

FIG. 2 illustrates examples of other behaviors, besides cheating, which can be used as a basis for player matchmaking. For example, the trained machine learning model(s) 216 may be configured to output a trust score 118 that relates to the probability of a player behaving, or not behaving, in accordance with a game-abandonment behavior (e.g., by abandoning (or exiting) the video game in the middle of a match). Abandoning a game is a behavior that tends to ruin the gameplay experience for non-abandoning players, much like cheating. As another example, the trained machine learning model(s) 216 may be configured to output a trust score 118 that relates to the probability of a player behaving, or not behaving, in accordance with a griefing behavior. A "griefer" is a player in a multiplayer video game who deliberately irritates and harasses other players within the video game 110, which can ruin the gameplay experience for non-griefing players. As another example, the trained machine learning model(s) 216 may be configured to output a trust score 118 that relates to the probability of a player behaving, or not behaving, in accordance with a vulgar language behavior. Oftentimes, multiplayer video games allow for players to engage in chat sessions or other social networking communications that are visible to the other players in the video game 110, and when a player uses vulgar language (e.g., curse words, offensive language, etc.), it can ruin the gameplay experience for players who do not use vulgar language. As yet another example, the trained machine learning model(s) 216 may be configured to output a trust score 118 that relates to a probability of a player behaving, or not behaving, in accordance with a "high-skill" behavior. In this manner, the scoring can be used to identify highly-skilled players, or novice players, from a set of players. This may be useful to prevent situations where experienced gamers create new user accounts pretending to be a player of a novice skill level just so that they can play with amateur players. Accordingly, the players matched together in the first match 218(1) may be those who are likely (as determined from the machine-learned scores 118) to behave in accordance with a particular "bad" behavior, while the players matched together in other matches, such as the second match 218(2) may be those who are unlikely to behave in accordance with the particular "bad" behavior.

It may be the case that the distribution of trust scores 118 output for a plurality of players (user accounts 120) is largely bimodal. For example, one peak of the statistical distribution of scores 118 may be associated with players likely to behave in accordance with a particular bad behavior, while the other peak of the statistical distribution of scores 118 may be associated with players unlikely to behave in accordance with that bad behavior. In other words, the populations of bad-behaving and good-behaving players may be separated by a clear margin in the statistical distribution. In this sense, if a new user account is registered with the video game service and is assigned a trust score that is between the two peaks in the statistical distribution, that user account will quickly be driven one way or another as the player interacts with the video game platform. Due to this tendency, the matchmaking parameters used by the matchmaking component 214 can be tuned to treat players with trust scores 118 that are not within the bottom peak of the statistical distribution similarly, and the matchmaking component 214 may be primarily concerned with separating/isolating the bad-behaving players with trust scores 118 that are within the bottom peak of the statistical distribution. Although the use of a threshold score is described herein as one example way of providing match assignments, other techniques are contemplated, such as clustering algorithms, or other statistical approaches that use the trust scores to preferentially match user accounts (players) with "similar" trust scores together (e.g., based on a similarity metric, such as a distance metric, a variance metric, etc.).

Furthermore, the matchmaking component 214 may not use player matchmaking for new user accounts 120 that have recently registered with the video game service. Rather, a rule may be implemented that a player is to accrue a certain level of experience/performance in an individual play mode before being scored and matched with other players in a multiplayer mode of a video game 110. It is to be appreciated that the path of a player from the time of launching a video game 110 for the first time to having access to the player matchmaking can be very different for different players. It may take some players a long time to gain access to a multiplayer mode with matchmaking, while other users breeze through the qualification process quickly. With this qualification process in place, a user account that is to be scored for matchmaking purposes will have played video games and provided enough data 114 to score 118 the user account 120 accurately.

Again, as mentioned, although many of the examples described herein reference "bad" behavior, such as cheating, game-abandonment, griefing, vulgar language, etc. as the targeted behavior by which players can be scored and grouped for matchmaking purposes, the techniques and systems described herein may be configured to identify any type of behavior using a machine-learned scoring approach, and to predict the likelihood of players engaging in that behavior for purposes of player matchmaking.

Figure 3:
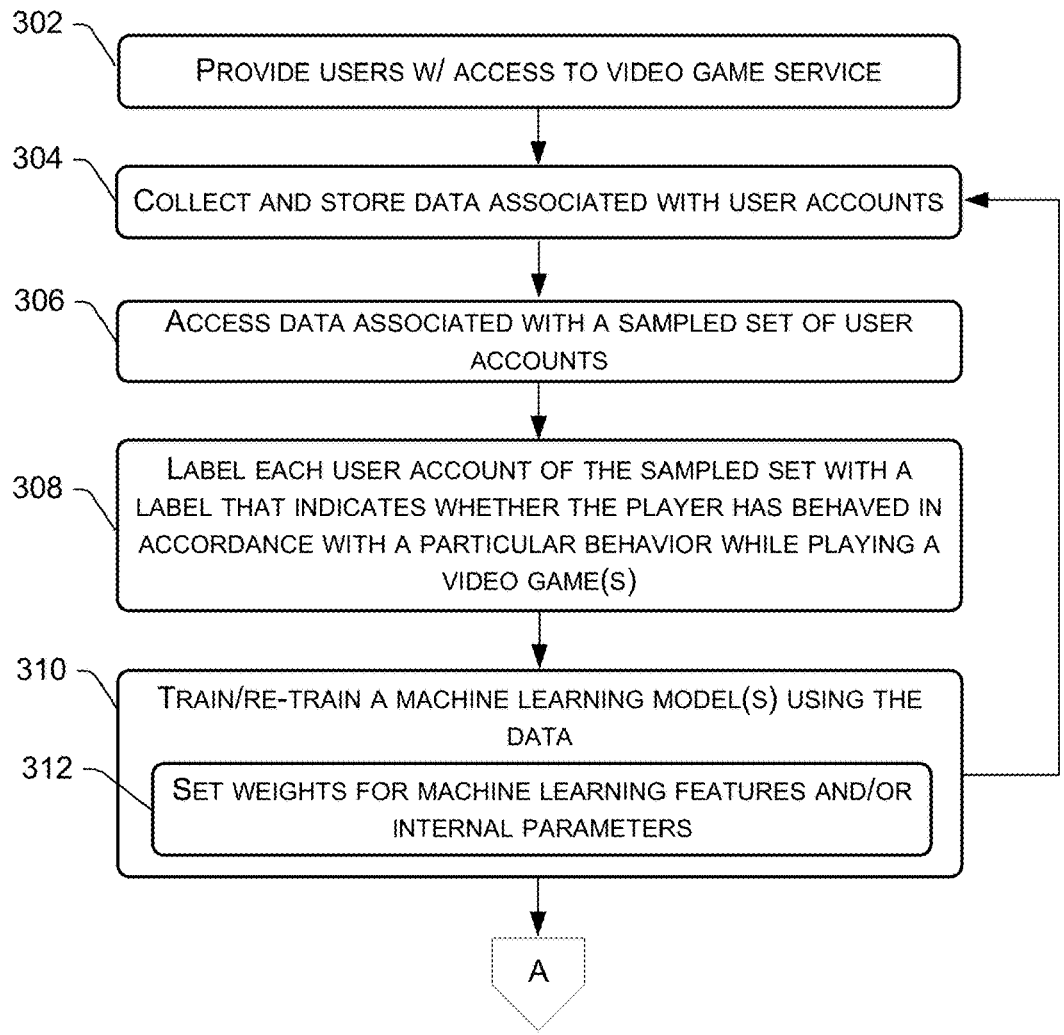
FIG. 3 is a flow diagram of an example process for training a machine learning model(s) to predict a probability of a player behaving, or not behaving, in accordance with a particular behavior.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes FIG. 3 is a flow diagram of an example process 300 for training a machine learning model(s) to predict a probability of a player behaving, or not behaving, in accordance with a particular behavior. For discussion purposes, the process 300 is described with reference to the previous figures.

At 302, a computing system 106 may provide users 102 with access to a video game service. For example, the computing system 106 may allow users to access and browse a catalogue of video games 110, modify user profiles, conduct transactions, engage in social media activity, and other similar and/or related actions. The computing system 106 may distribute video games 110 (and content thereof) to client machines 104 as part of the video game service. In an illustrative example, a user 102 with access to the video game service can load an installed client application, login with a registered user account, select a desired video game 110, and execute the video game 110 on his/her client machine 104 via the client application.

At 304, the computing system 106 may collect and store data 114 associated with user accounts 120 that are registered with the video game service. This data 114 may be collected at block 304 whenever users 102 access the video game service with their registered user accounts 120 and use this video game platform, such as to play video games 110 thereon. Over time, one can appreciate that a large collection of data 114 tied to registered user accounts may be available to the computing system 106.

At 306, the computing system 106, via the training component 210, may access (historical) data 114 associated with a sampled set of user accounts 120 registered with the video game service. At least some of the (historical) data 114 may have been generated as a result of players playing one or multiple video games 110 on the video game platform provided by the video game service. For example, the (historical) data 114 accessed at 306 may represent match history data of the players who have played one or multiple video games 110 (e.g., in the multiplayer mode by participating in matches). In some embodiments, the (historical) data 114 may indicate whether the sampled set of user accounts 120 have been transferred between players, or other types of user activities with respect to user accounts 120.

At 308, the computing system 106, via the training component 210, may label each user account 120 of the sampled set of user accounts 120 with a label that indicates whether the user account is associated with a player who has behaved in accordance with the particular behavior while playing at least one video game 110 in the past. Examples of labels are described herein, such as whether a user account 120 has been banned in the past for cheating, which may be used as a label in the context of scoring players on their propensity to cheat, or not cheat, as the case may be. However, the labels may correspond to other types of behavior, such as a label that indicates whether the user account is associated with a player who has abandoned a game in the past, griefed during a game in the past, used vulgar language during a game in the past, etc.

At 310, the computing system 106, via the training component 210, may train a machine learning model(s) using the (historical) data 114 as training data to obtain the trained machine learning model(s) 216. As shown by sub-block 312, the training of the machine learning model(s) at block 310 may include setting weights for machine learning. These weights may apply to a set of features derived from the historical data 114. Example features are described herein, such as those described above with reference to FIG. 2. In some embodiments, the weights set at block 312 may apply to parameters that are internal to the machine learning model(s) (e.g., weights for neurons in a hidden-layer of a neural network). These internal parameters of the machine learning model(s) may or may not map one-to-one with individual input features of the set of features. As shown by the arrow from block 310 to block 304, the machine learning model(s) 216 can be retrained using updated (historical) data 114 to obtain a newly trained machine learning model(s) 216 that is adapted to recent player behaviors. This allows the machine learning model(s) 216 to adapt, over time, to changing player behaviors.

Figure 4:
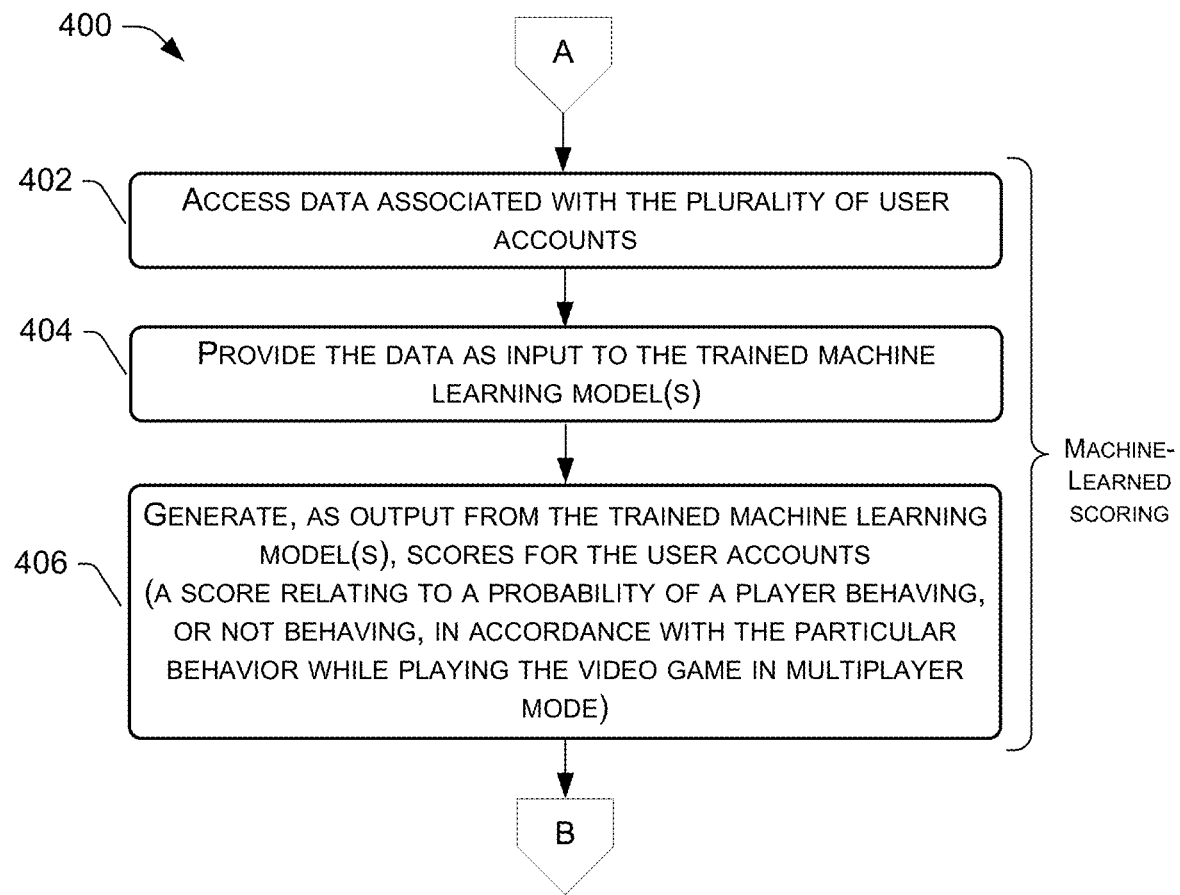
FIG. 4 is a flow diagram of an example process for utilizing a trained machine learning model(s) to determine trust scores for user accounts, the trust scores relating to probabilities of players behaving, or not behaving, in accordance with a particular behavior.

FIG. 4 is a flow diagram of an example process 400 for utilizing a trained machine learning model(s) 216 to determine trust scores 118 for user accounts 120, the trust scores 118 relating to (or indicative of) probabilities of players behaving, or not behaving, in accordance with a particular behavior. For discussion purposes, the process 400 is described with reference to the previous figures. Furthermore, as indicated by the off-page reference "A" in FIGS. 3 and 4, the process 400 may continue from block 310 of the process 300.

At 402, the computing system 106, via the scoring component 212, may access data 114 associated with a plurality of user accounts 120 registered with a video game service. This data 114 may include any information (e.g., quantifiable information) in the set of features, as described herein, the features having been used to train the machine learning model(s) 216. This data 114 constitutes the unknown input that is to be input to the trained machine learning model(s) 216.

At 404, the computing system 106, via the scoring component 212, may provide the data 114 accessed at block 402 as input to the trained machine learning model(s) 216.

At 406, the computing system 106, via the scoring component 212, may generate, as output from the trained machine learning model(s) 216, trust scores 118 associated with the plurality of user accounts 120. On an individual basis, a score 118 is associated with an individual user account 120, of the plurality of use accounts 120, and the score 118 relates to a probability of a player 102 associated with the individual user account 120 behaving, or not behaving, in accordance with a particular behavior while playing one or more video games 110 in a multiplayer mode. The particular behavior, in this context, may be any suitable behavior that is exhibited in the data 114 so that the machine learning model(s) can be trained to predict players with a propensity to engage in that behavior. Examples include, without limitation, a cheating behavior, a game-abandonment behavior, a griefing behavior, or a vulgar language behavior. In some embodiments, the score 118 is a variable that is normalized in the range of [0,1]. This trust score 118 may have a monotonic relationship with a probability of a player behaving (or not behaving, as the case may be) in accordance with the particular behavior while playing a video game 110. The relationship between the score 118 and the actual probability associated with the particular behavior, while monotonic, may or may not be a linear relationship.

Thus, the process 400 represents a machine-learned scoring approach, where scores 118 (e.g., trust scores 118) are determined for user accounts 120, the scores indicating the probability of a player using that user account 120 engaging in a particular behavior in the future. Use of a machine-learning model(s) in this scoring process allows for identifying complex relationships of player behaviors to better predict player behavior, as compared to existing approaches that attempt to predict the same. This leads to a more accurate prediction of player behavior with a more adaptive and versatile system that can adjust to changing dynamics of player behavior without human intervention.

Figure 5:
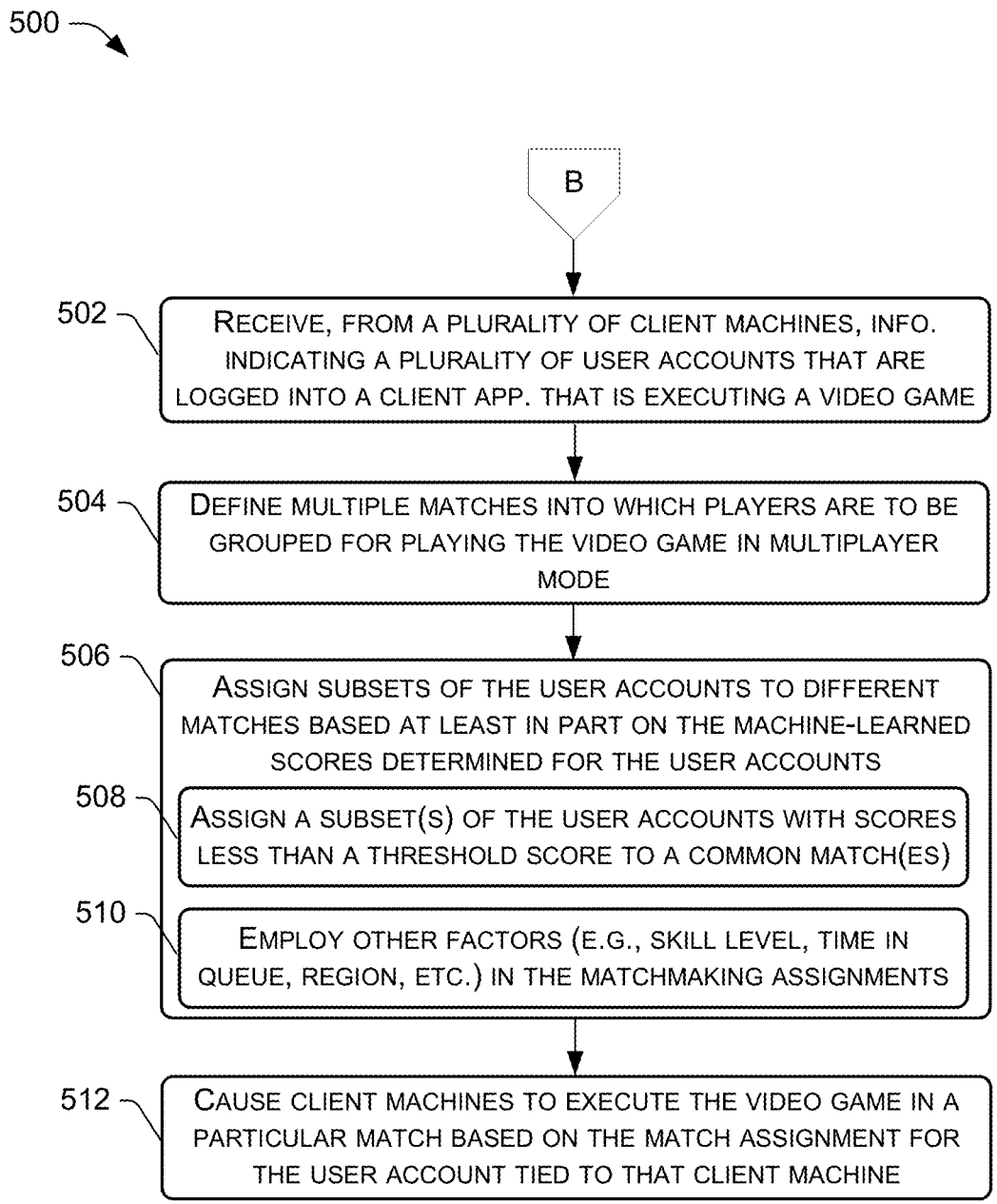
FIG. 5 is a flow diagram of an example process for assigning user accounts to different matches of a multiplayer video game based on machine-learned trust scores that relate to likely player behavior.

FIG. 5 is a flow diagram of an example process 500 for assigning user accounts 120 to different matches of a multiplayer video game based on machine-learned trust scores 118 that relates to likely player behavior. For discussion purposes, the process 500 is described with reference to the previous figures. Furthermore, as indicated by the off-page reference "B" in FIGS. 4 and 5, the process 500 may continue from block 406 of the process 400.

At 502, the computing system 106 may receive information 122 from a plurality of client machines 104, the information 122 indicating logged-in user accounts 120 that are logged into a client application executing a video game 110 on each client machine 104. For example, a plurality of players 102 may have started execution of a particular video game 110 (e.g., a first-person shooter game), wanting to play the video game 110 in multiplayer mode. The information 112 received 122 at block 502 may indicate at least the logged-in user accounts 120 for those players.

At 504, the computing system 106, via the matchmaking component 214, may define multiple matches into which players 102 are to be grouped for playing the video game 110 in the multiplayer mode. Any number of matches can be defined, depending on various factors, including demand, capacity, and other factors that play into the matchmaking process. In an example, the multiple defined matches at block 504 may include at least a first match 218(1) and a second match 218(2).

At 506, the computing system 106, via the matchmaking component 214, may assign a first subset of the logged-in user accounts 120 to the first match 218(1), and a second subset of the logged-in user accounts 120 to the second match 218(2) based at least in part on the scores 118 determined for the logged-in user accounts 120. As mentioned, any number of matches can be defined such that further breakdowns and additional matches can be assigned to user accounts at block 506.

As shown by sub-block 508, the assignment of user accounts 120 to different matches may be based on a threshold score. For instance, the matchmaking component 214 may determine that the scores 118 associated with the first subset of the logged-in user accounts 120 are less than a threshold score and may assign the first subset of the logged-in user accounts 120 to the first match based on those scores being less than the threshold score. Similarly, the matchmaking component 214 may determine that the scores 118 associated with the second subset of the logged-in user accounts 120 are equal to or greater than the threshold score and may assign the second subset of the logged-in user accounts 120 to the second match based on those scores being equal to or greater than the threshold score. This is merely one example way of providing match assignments 124, however, and other techniques are contemplated. For instance, clustering algorithms, or other statistical approaches may be used in addition, or as an alternative, to the use of a threshold score. In an example, the trust scores 118 may be used to preferentially match user accounts (players) with "similar" trust scores together. Given a natural tendency of the distribution of trust scores 118 to be largely bimodal across a plurality of user accounts 120, grouping trust scores 118 together based on a similarity metric (e.g., a distance metric, a variance metric, etc.) may provide similar results to that of using a threshold score. However, the use of a similarity metric to match user accounts together in groups for matchmaking purposes may be useful in instances where the matchmaking pool is small (e.g., players in a small geographic region who want to play less popular game modes) because it can provide a more fine-grained approach that allows for progressive tuning of the relative importance of the trust score versus other matchmaking factors, like skill level. In some embodiments, multiple thresholds may be used to "bucketize" user accounts 120 into multiple different matches.

As shown by sub-block 510, other factors besides the trust score 118 can be considered in the matchmaking assignments at block 506. For example, the match assignments 124 determined at block 506 may be further based on skill levels of players associated with the logged-in user accounts, amounts of time the logged-in user accounts have been waiting to be placed into one of the multiple matches, geographic regions associated with the logged-in user accounts, and/or other factors.

At 512, the computing system 106 may cause (e.g., by providing control instructions) the client application executing the video game 110 on each client machine 104 that sent the information 122 to initiate one of the defined matches (e.g., one of the first match 218(1) or the second match 218(2)) based at least in part on the logged-in user account 120 that is associated with that the client machine 104. For example, with the first match 218(1) and the second match 218(2) defined, the computing system 106 may cause a first subset of the plurality of client machines 104 associated with the first subset of the logged-in user accounts 120 to execute the video game 110 in the first match 218(1), and may cause a second subset of the plurality of client machines 104 associated with the second subset of the logged-in user accounts 120 to execute the video game 110 in the second match 218(2).

Because machine-learned trust scores 118 are used as a factor in the matchmaking process, an improved gaming experience may be provided to users who desire to play a video game in multiplayer mode in the manner it was meant to be played. This is because the techniques and systems described herein can be used to match together players who are likely to behave badly (e.g., cheat), and to isolate those players from other trusted players who are likely to play the video game legitimately.

Figure 6:
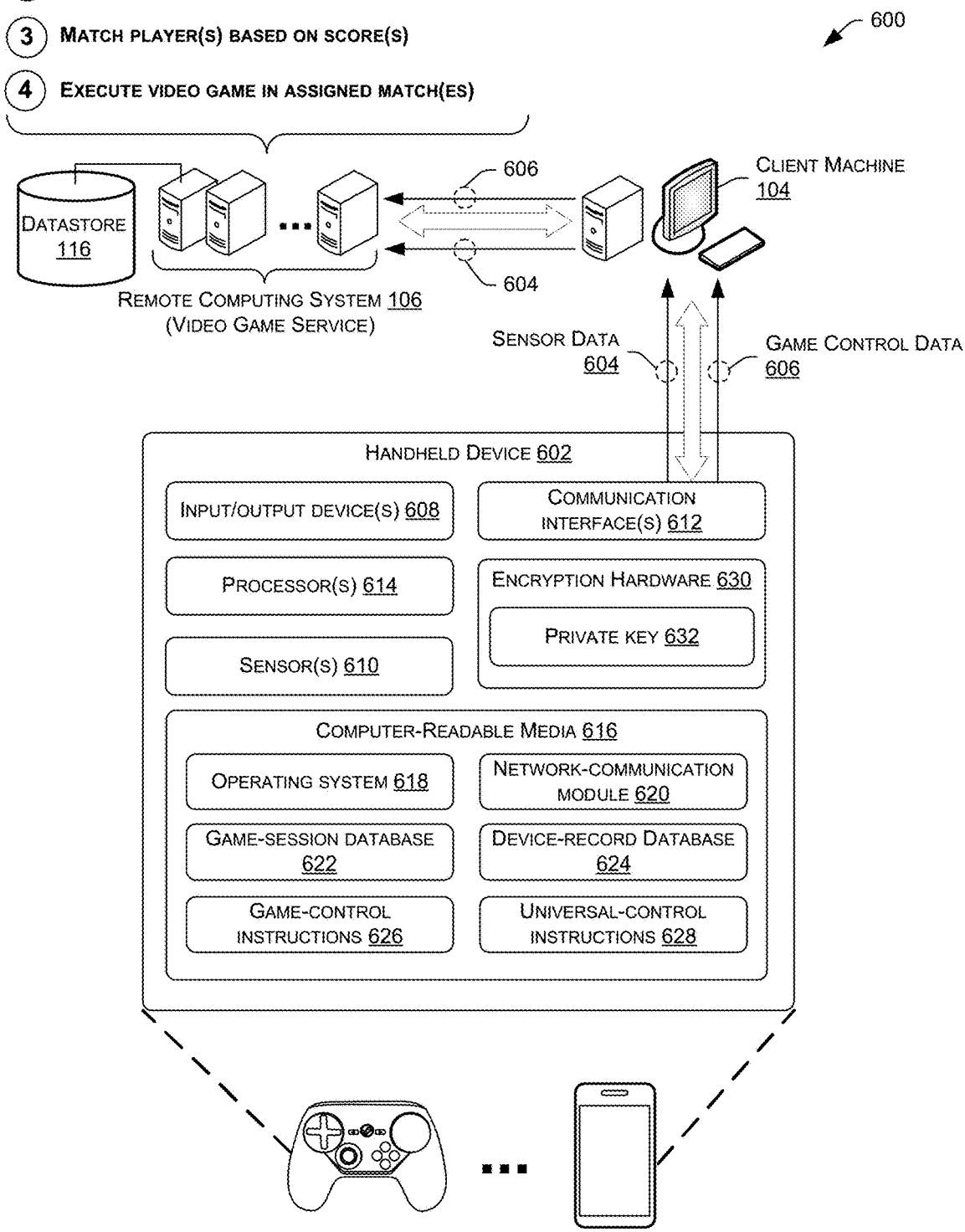
FIG. 6 is a diagram illustrating an example environment including a block diagram illustrating example components of a handheld device, FIG. 6 showing how sensor data received by a remote computing system can be used for machine-learned trust scoring.

FIG. 6 is a diagram illustrating an example environment 600 including a block diagram illustrating example components of a handheld device 602, FIG. 6 showing how sensor data 604 received by a remote computing system 106 can be used for machine-learned trust scoring. The handheld device 602 of FIG. 6 may be used by a user 102 to interact with the video game platform, as described herein. For example, a user 102 may pair the handheld device 602 with a client machine 104 that is executing a video game client (e.g., gaming software to play video games 110) thereon. Once the handheld device 602 is paired with the client machine 104 and is able to communicate therewith (e.g., by sending/receiving data to/from the client machine 104), the handheld device 602 can be used to interact with the video game platform described herein, such as to register the handheld device 602 with a user account 120, access video games 110 available from the remote computing system 106, and play video games 110 using the handheld device 602.

The handheld device 602 may represent a handheld game controller, such as a game controller designed to be held by one or both hands of the user 102, and configured with one or more finger-operated controls to be operated by fingers and/or thumbs of the user's 102 hand(s). In some embodiments, the handheld device 602 may further be configured to be operated by moving (e.g., panning, rotating, tilting, etc.) the game controller in three-dimensional (3D) space. It is to be appreciated that the handheld device 602 may represent any other suitable type of handheld device, such as a mobile phone (e.g., a smart phone), a tablet computer, a portable digital assistant (PDA), a wearable computer (e.g., a smart watch, a head-mounted display (HMD)), a portable game player, and/or any similar handheld electronic device. The term "handheld," as used herein to describe a handheld device 602, means a device that is configured to be held by a user 102, regardless of whether the device is held by a hand(s) of the user 102, or by another portion of the user's 102 body (e.g., a wearable device worn on a wrist, arm, leg, waist, head, etc. is considered a "handheld" device, as the term is used herein).

As shown in FIG. 6, the handheld device 602 includes one or more input/output (I/O) devices 608, such as finger-operated controls (e.g., joysticks, trackpads, triggers, depressible buttons, etc.), potentially other types of input or output devices, such as a touchscreen(s), a microphone(s) to receive audio input, such as user voice input, a camera(s) or other types of sensor (e.g., sensor(s) 610) that can function as an input device to receive gestural input, such as motion of the handheld device 602 and/or a hand of the user 102. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons. The input device(s) can facilitate the input of biometric data of a user 102, such as obtaining a fingerprint or palmprint, scanning a user's eye and/or face, capturing a user's voice, and the like, for biometric recognition/authentication of the user 102.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld device 602 may additionally or alternatively comprise any other type of output device. In some instances, output by the one or more output devices may be based on input received by one or more of the input devices. For example, actuation of a control may result in the output of a haptic response by a vibrator located adjacent (e.g., underneath) the control or at any other location.

In addition, the handheld device 602 may include one or more communication interfaces 612 to facilitate a wireless connection to a network and/or to one or more remote systems (e.g., a client machine 104 executing an application, a game console, a wireless access point, etc.). The communication interfaces 612 may implement one or more of various wireless technologies, such as Wi-Fi, Bluetooth, radio frequency (RF), and so on. It is to be appreciated that the handheld device 602 may further include physical ports to facilitate a wired connection to a network, a connected peripheral device, or a plug-in network device that communicates with other wireless networks.

In the illustrated implementation, the handheld device 602 further includes one or more processors 614 and computer-readable media 616. In some implementations, the processors(s) 614 may include a central processing unit (CPU), a graphics processing unit (GPU), both CPU and GPU, a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 614 may possess its own local memory, which also may store program modules, program data, and/or one or more operating systems.

The computer-readable media 616 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 616 may be implemented as computer-readable storage media ("CRSM"), which may be any available physical media accessible by the processor(s) 614 to execute instructions stored on the computer-readable media 616. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 614.

Several modules such as instruction, datastores, and so forth may be stored within the computer-readable media 616 and configured to execute on the processor(s) 614. A few example functional modules are shown as stored in the computer-readable media 616 and executed on the processor(s) 614, although the same functionality may alternatively be implemented in hardware, firmware, or as a system on a chip (SOC).

An operating system module 618 may be configured to manage hardware within and coupled to the handheld device 602 for the benefit of other modules. In addition, the computer-readable media 616 may store a network-communications module 620 that enables the handheld device 602 to communicate, via the communication interfaces 612, with one or more other devices, such as a client machine 104 (e.g., a PC) executing an application (e.g., a game application), a game console, a remote computing system 106, or the like. The computer-readable media 616 may further include a game-session database 622 to store data associated with a game (or other application) executing on the handheld device 602 or on the client machine 104 connected to the handheld device 602. The computer-readable media 616 may also include a device-record database 624 that stores data associated with devices to which the handheld device 602 couples, such as the client machine 104 (e.g., a PC, a game console, etc.), the remote computing system 106, and the like. The computer-readable media 616 may further store game-control instructions 626 that configure the handheld device 602 to function as a gaming controller, and universal-control instructions 628 that configure the handheld device 602 to function as a controller of other, non-gaming devices.

The handheld device 602 is also shown as including one or more sensors 610. For example, the sensor(s) 610 may include a motion sensor(s), such as an inertial measurement unit(s) (IMU(s)), which may include one or more gyroscopes, and/or accelerometers, and/or magnetometers, and/or compasses, or any other suitable motion sensor. In some embodiments, the sensor(s) 610 may be implemented as a standalone gyroscope(s), accelerometer(s), magnetometer(s), compass(es), etc., and not necessarily implemented as an IMU(s). In some embodiments, one or more of these sensors may be utilized for providing six-component motion sensing. For instance, an IMU may be configured to sense and generate the sensor data 604 that is indicative of translational and/or rotational movement about a 3D space. The sensor data 604 generated by such a sensor(s) 610 may relate to the extent, rate, and/or acceleration of translational movement in 3D space (X, Y, and Z movement), as well as the extent, rate, and/or acceleration of rotational movement in 3D space (roll, pitch, and yaw). Measurements may be generated in terms of a 3D coordinate system, such as Cartesian (X, Y, and Z) or spherical coordinate systems. The sensor data 604 may include, for example, measurements in terms of displacement (e.g., displacement since the preceding time log), velocity, and/or acceleration of translational movement (denoted by variables: d, v, a) and angular movement (denoted by variables: $\theta$, $\omega$, $\alpha$). The sensor data 604 may further include times at which the sensor data 604 is generated and/or transmitted, e.g., at any suitable time interval, so that a history of sensor data 604 can be collected and temporarily, or permanently, stored on the handheld device 602.

As another example, the sensor(s) 610 may include a touch sensor(s) configured to sense proximity of an object, such as a finger, palm, etc., to the touch sensor(s), which may be based on any suitable touch-sensing technologies, such as a capacitive touch sensor, a resistive touch sensor, an infrared touch sensor, a touch sensor that utilizes acoustic soundwaves to detect a proximity of a finger 102, or any other type of touch sensor. For example, a touch sensor(s) may be disposed underneath or on a surface of the device, and/or within or on a finger-operated control, in order to detect proximity of a finger(s) to the surface or to the finger-operated control. In response to detecting the proximity (e.g., the finger contacting or hovering above the surface), the touch sensor(s) may generate sensor data 604 indicative of the proximity of the finger(s). Such as touch sensor(s) may be embedded in a handle(s) of the handheld device 602 to detect a user's 102 grip, and/or within various controls, including trackpads, joysticks, buttons, etc. In implementations that utilize capacitive-based sensing, the touch sensor(s) may include electrodes (e.g., a transmitter electrode and a receiver electrode of a transcapacitive-type sensor), and voltage can be applied to the electrodes so that the electrodes are configured to measure capacitance changes at the electrodes, which can be translated into sensor data 604 in the form of capacitance values that are indicative of proximity of an object to the sensor(s) 610. For example, capacitance changes at the electrodes of a capacitive-based touch sensor(s) may be influenced by an object (such as the finger) that is in proximity to the electrodes. The raw capacitance can be digitized into proximity values to generate the sensor data 604.

As another example, the sensor(s) 610 may include a pressure sensor(s), such as a force sensing resistor(s) (FSR(s)). For example, a FSR may include a conductive material spaced apart from a resistive membrane (e.g., a semiconductive material, such as an ink composition), as well as an actuator that is configured to convey a force onto the resistive membrane so that the resistive material contacts the conductive material under the application of a compressive force applied to the actuator. A FSR may exhibit varying resistance in response to variable forces to generate sensor data 604 corresponding to the resistance values. A FSR can be a "ShuntMode" FSR or a "ThruMode" FSR. With a ShuntMode FSR, the conductive material spaced from the resistive membrane may be a plurality of interdigitated metal fingers. When a force is applied to the actuator of the FSR, the resistive membrane contacts some of the interdigitated metal fingers, which shunts the metal fingers, thereby varying the resistance across the output terminals of the FSR, which can be digitized into a FSR value to generate the sensor data 604. In some embodiments, a pressure sensor(s) may additionally, or alternatively, include other types of pressure sensing mechanisms, such as piezoelectric sensors, strain gauges, and the like.

Other examples of sensors 610 configured to generate corresponding sensor data 604 may include, without limitation, a temperature sensor(s), a humidity sensor(s), a camera(s), and the like. Regardless of the type of sensor(s) 610 of the handheld device 602, the sensor(s) 610 is/are configured to generate sensor data 604 that relates, in some manner, to the physical state of the handheld device 602. For instance, a touch sensor(s) may generate sensor data 604 indicative of whether an object (e.g., a finger) is contacting, or near to, a portion of the device 602 (e.g., a directional pad (D-pad), a joystick, a trigger button, a bumper button, a selector button, etc.) that includes the touch sensor(s). A pressure senor(s), as another example, may generate sensor data 604 indicative of whether an object is pressing upon a portion of the device 602, and whether that portion of the device 602 is being pressed upon lightly or heavily by the object. A motion sensor (e.g., a gyroscope and/or accelerometer), as yet another example, may generate sensor data 604 indicative of whether the handheld device 602 has changed in orientation and/or spatial location within a 3D space, and/or whether the handheld device 602 is being moved rapidly or slowly. Thus, the sensor(s) 610 of the handheld device 602 are configured to generate sensor data 604 indicative of these, and other, kinds of physical states of the device 602.

FIG. 6 illustrates that the handheld device 602 may further include encryption hardware 630. For example, a service provider of the video game service, and/or a third-party manufacturer, may manufacture "trusted" handheld devices 602, which, at a time of manufacture, are manufactured to have a tamper resistant hardware component embedded therein. This embedded hardware component may include the encryption hardware 630 depicted in FIG. 6, which may, in turn, store a private key 632. For example, the private key 632 may be persisted in non-volatile memory of the handheld device 602.

In some embodiments, the encryption hardware 630 is tamper resistant. For example, the encryption hardware 630 may be included, or encased, within a tamper resistant casing, and the encryption hardware 630 may be configured to disable itself if the tamper resistant casing is damaged. For instance, the encryption hardware 630 may be configured to erase or delete the private key 632, and/or send an alert to the remote computing system 106, if the tamper resistant casing is damaged or otherwise tampered with. This makes it difficult for users to illicitly gain access to the private key 632, or at least to do so undetected, which prevents sharing the private key 632 with others and possibly using the private key 632 to act as a "smurf" through another user account 120. In online gaming, "smurfing" is the act of a player of a certain skill level playing under another person's account or a secondary account to appear to be a lower rank or skill level.

In some embodiments, a user 102 may initially associate, or register, the handheld device 602 with his/her user account 120 (and possibly with additional user accounts 120, such as family member accounts). This may be accomplished by conducting an initial registration procedure for a handheld device 602. The initial registration procedure may include a first-time activation procedure that uses, for example, a two-factor authentication (2FA) step for added security. For example, the user 102 may pair the handheld device 602 with a client machine 104 in the vicinity of the handheld device 602, using, for example, a short range wireless protocol, such as Bluetooth. The user 102 may log into his/her user account 120 using a client application (e.g., a video game client) executing on the client machine 104, or on a mobile device of the user 102 (e.g., a mobile phone). In response to the user 102 logging in, the remote computing system 602 may receive an indication of a paired, but unregistered/unactivated, device 602, and may send an activation code to the user 102, such as by sending message, such as a text to a mobile number or an e-mail to an email address specified in the user account 120. The user 102 may access the message to obtain the activation code, and may enter the activation code via the video game client executing on the user's phone or on the client machine 104 (e.g., by entering the activation code using the handheld device 602). If the remote system 106 receives the correct activation code within a prescribed time limit, the handheld device 602 may be associated with the user account 120 of the user 102, such as by indicating, in the user account 120, that the handheld device 602 is a registered device of the user account 120, a time and date of registration, a location where the handheld device 602 was activated, and the like. The remote computing system 106 may also associate the user account 120 with the private key 632 of the handheld device 602 and/or with biometric data of a user 102 (e.g., fingerprint, eye-print, face-print, voice-print, etc.) obtained by an input device of the handheld device 602 as a means of authenticating the user 102 in the future, such as when the user 102 logs into his/her user account 120 in the future and is using the handheld device 602 registered with that user account 120.

In some embodiments, additional layers of security may be implemented in order to make switching the handheld device 602 from one user account 120 to another user account 120 more secure, which may help prevent illicit use of a trusted handheld device 602 if, say, the device 602 were to be stolen or lost. For example, the remote computing system 106 may enforce a waiting period (e.g., a waiting period of several days) since associating/registering the device 602 with a first user account 120 before the device 602 is allowed to be switched to a second user account 120 (e.g., by dissociating/unregistering the device 602 from the first user account 120 and associating/registering the device 602 with the second user account 120). The remote computing system 106 may additionally, or alternatively, restrict the number of times a user 102 is allowed to switch the handheld device 602 between user accounts 120 within a given time period (e.g., a user 102 may be allowed to switch the handheld device 602 from one user account 120 to another user account 120 no more than two times over the span of an hour). These additional layers may help curb unauthorized use of a trusted handheld device 602.

Once the handheld device 602 is registered with a user account(s) 120, a user 102 may use the device 602 to interact with the video game platform, such as by connecting the handheld device 602 to their client machine 104 (e.g., pairing the device 602 with the client machine 104 over a wireless communication link)—which may occur automatically after a first pairing procedure using the device-record database 624—and using the device 602 as a handheld game controller to play a video game 110. In this scenario, the client machine 104 can be used to display imagery of the video game 110 while the user 102 plays the video game 110 by operating the handheld device 602. At any suitable time during the interaction with the video game platform, the handheld device 602 may obtain biometric data of a user 102 (e.g., fingerprint, eye-print, face-print, voice-print, etc.) via an input device of the handheld device 602, and may send, via the communication interface(s) 612, the obtained biometric data to the remote computing system 106 (e.g., by routing the biometric data through the client machine 104 to the remote computing system 106), and the biometric data may be used by the remote computing system 106 for authenticating the user account 120, authenticating the user 102, and/or authenticating the handheld device 602. Furthermore, at any suitable time during the interaction with the video game platform, the private key 632 may be used by logic of the handheld device 602 to encrypt device outputs, such as the game control data 606 and/or the sensor data 604, that is transmitted by the handheld device 602 during use of the device 602. For example, the private key 632 may be used to sign the game control data 606 and/or the sensor data 604 to convert the data to a ciphertext form using any suitable encryption algorithm, and the device 602 may send, via the communication interface(s) 612, the encrypted data to the remote computing system 106 (e.g., by routing the encrypted data through the client machine 104 to the remote computing system 106). The remote computing system 106 may maintain a repository of private keys in the datastore 116 (or database 116) for trusted handheld devices, which may include a copy of the private key 632 used by the handheld device 602 to encrypt the data it sends to the remote computing system 106. The remote computing system 106 may have recorded the private keys in the datastore 116 at a time of, or after, manufacture of the trusted handheld devices. With the private keys accessible to the remote computing system 106, the system 106 may decrypt the encrypted data it receives from the handheld device 602 to verify that the received data was encrypted with the expected private key 632. Thus, the remote system 106, with knowledge of the private key 632 used by the handheld device 602 to encrypt device outputs, can use its copy of the private key 632 for authenticating the user account 120, authenticating the user 102, and/or authenticating the handheld device 602, among other possible uses of the private key 632. In some embodiments, the remote computing system 106, in response to receiving data associated with a logged-in user account 120, may request that the user 102 enter a code (e.g., a personal identification number (PIN), a passcode, a passphrase, etc.) to authenticate the user 102 on each login of the user account 120. Such a request may be sent via a 2FA device of the user 102 (e.g., via a mobile phone, via the client machine 104, etc.), and the response to the request may be received by the remote system 106 from the same 2FA device of the user 102. In some embodiments, additional user action is not required in order to use an already-registered handheld device 602 in association with a corresponding, logged-in user account 120. That is, all that may be required to use the handheld device 602 in association with a user account 120 to which the device 602 is registered is the device 602 using its private key 632 to encrypt data and sending the encrypted data to the remote computing system 106, and the remote computing system 106 decrypting the data to verify that the received data was encrypted with the expected private key 632. For example, the remote system 106 may send a chunk of data to the handheld device 602, the device may encrypt the chunk of data and return the encrypted data to the remote system 106, and the remote system 106 can then verify that the encryption was performed correctly, all without the key 632 itself needing to be transmitted.

For example, the datastore 116 (or database 116) accessible to the remote computing system 106 may maintain biometric data and/or a plurality of private keys that have been associated with a plurality of trusted handheld devices, such as the handheld device 602, and the remote computing system 106 can compare biometric data and/or private keys, such as the private key 632, used to encrypt data received from client machines 104 and/or handheld devices to determine if a received biometric data and/or private key matches any of the biometric data and/or private keys maintained in the database 116. These operations may be performed for authentication purposes and/or for computing trust scores, as described herein. In other words, the receipt of biometric data that matches biometric data, and/or encrypted data that was encrypted with a private key 632 that matches a private key, maintained in the database 116 may be used to authenticate the user 102, the device 602, and/or the user account 120 associated therewith, and/or the receipt of a matching biometric data and/or encrypted data that was encrypted with a matching private key 632 may be used to generate a trust score for the associated user account 120, which may be used for player matchmaking. In this sense, user accounts 120 that are associated with handheld devices 602 that provide, to the remote computing system 106, matching biometric data and/or encrypted data that was encrypted using a matching private key 632 can be authenticated seamlessly (e.g., without additional user action, in some cases), and are more likely to be matched with user accounts 120 of other human players, as opposed to being matched with "untrusted" user accounts 120 likely to be associated with non-human players (e.g., software designed for cheating).

Accordingly, as a user 102 utilizes the handheld device 602 to interact with the video game platform—e.g., to play one or more video games 110 on their respective client machines 104, the sensor data 604 and the game control data 606 may be sent to the client machine 104 and forwarded from the client machine 104 to the remote computing system 106. The game control data 606 is usable to control an aspect(s) of the video game 110, and is thereby processed by the video game 110 to determine how to render the next frame of the video game 110. The sensor data 604 represents raw, unfiltered sensor data 604, such as the raw data generated by a gyroscope, raw data generated by an accelerometer, and/or raw data generated by a touch sensor (e.g., a capacitive touch pad). In a streaming implementation, a video game 110 may execute on the remote computing system 106, and the remote computing system 106 may capture video game 110 data and may send the video game 110 data over the network 108 to the client machine 104 of a user 102. This may involve the remote computing system 106 capturing the state of the video game 110, encoding the video and audio data into bits, transmitting the encoded bits to the client machine 104 over the computer network 108, and an application (e.g., a video game client) executing on the client machine 104 may decode the bits to output imagery via a display(s) and audio via a speaker(s) of (or via headphones connected to) the client machine 104 for a given frame. The user 102 may react to the video and audio he/she is seeing by operating the handheld device 602. For example, the user 102 may actuate a control (e.g., press a directional pad (D-pad), deflect a joystick, swipe a finger on a trackpad, etc.) of the handheld device, and/or may tilt or move the handheld device 602 in 3D space to control an aspect(s) of the video game 110. In response to operation of the handheld device 602, the handheld device 602 may generate game control data 606 that is sent to the remote computing system 106, either directly via a wireless access point and over the computer network 108, or via the client machine 104 with which the handheld device 602 is associated. In either case, the game control data 606 can be sent to the remote computing system 106 in real-time for controlling an aspect(s) of the video game 110. For example, the game control data 606 can be processed by the video game 110 to control movement of a virtual object (e.g., a player-controlled character) of the video game 110 by causing the virtual object to move within a virtual world represented by a scene on a display of the client machine 104.

While the game control data 606 may include at least some sensor data 604 generated by a sensor(s) 610 of the device 602, such as filtered/dampened sensor data 604 and/or amplified sensor data 604, the sensor data 604 that is sent by the device 602 to the remote computing system 106, as depicted in FIG. 6, represents raw, unfiltered sensor data 604 that is not used to control an aspect of the video game 110, but is used to generate a machine-learned trust score for the associated user account 120.

At Step 1 in FIG. 6, the computing system 106 may train a machine learning model(s) 216 using at least historical sensor data 604 sampled from the datastore 116. For example, the computing system 106 may access a portion of historical sensor data 604 associated with a sampled set of user accounts 120 registered with the video game service, and may use the sampled sensor data 604 to train the machine learning model(s) 216. As described herein, the historical sensor data 604 may have been received from client machines 104 along with historical game control data 606 as a result of users 102 interacting with the video game platform using their handheld devices 602. In some embodiments, the portion of the sensor data 604 used as training data is represented by a set of features, and each user account 120 of the sampled set is labeled with a label that indicates whether the historical game control data 606 associated with the corresponding user account 120 was generated by a handheld device 602 while a human player held and operated the device 602, as opposed to having been synthesized and/or modified using software. In other words, the user accounts 120 that are determined to be associated with game control data 606 that was human-generated by virtue of human users 102 operating handheld devices 602 can be labeled as such, while other user accounts 120 that are determined to be associated with synthesized and/or modified game control data (i.e., data synthesized and/or modified by software to control aspects of video games) can be labeled as such. In this manner, a supervised learning approach can be taken to train the machine learning model(s) 216 to predict players who are likely to be legitimate human players operating handheld devices 602, as opposed to non-human software that is designed for cheating.

For instance, when a human operates a handheld device 602, there may be nuanced movements of the handheld device 602 that are unintentional movements, yet they can be detected by one or more physical sensors 610 of the handheld device 602 and may be exhibited in the sensor data 604 as a consequence. Based on the notion that such sensor data 604 will exhibit these nuances, the machine learning model(s) 216 may be trained with sensor data 604 as training data in order to distinguish between human players and non-human players by recognizing these nuances in sensor data 604—e.g., movements, finger proximity, etc. that was generated by a physical sensor(s) 610 of a real, physical, handheld device 602 as a result of the handheld device 602 having been mechanically operated (e.g., by a human user 102). Conversely, if sensor data 604 is received, but it does not exhibit the expected nuances that result from human operation of a handheld device 602, it may be deduced that the corresponding game control data 606 was not generated as a result of the operation of a real, tangible handheld device 602, but was instead synthesized and/or modified using software. For example, a cheating player may employ third party software, or develop their own software, that is configured to automate the motions of the cheater's avatar (e.g., by programmatically moving a mouse cursor to a target and firing a weapon in an automated fashion). This so-called "aimbot" software effectively plays the video game 110 on behalf of a human player, such that a human player is not actually playing the video game 110, and the software is synthesizing and/or modifying game control data 606 that is processed by the video game 110 in the same way that real game control data 606 is processed, thereby giving the cheating player an advantage over legitimate human players who are not cheating. If such synthesized and/or modified game control data 606 went undetected, computerized algorithms may become ubiquitous and widely used to enhance cheating players' performances in multiplayer games, which can ruin the experience of human players who would like to legitimately play the video game 110, and who may be matched with these computerized algorithms. In these instances, attempts to mimic sensor data 604 that is generated by human-operation of a handheld device 602 can be detected by a machine learning model(s) 216 that is trained to distinguish between human players and non-human players, such as aimbots, and these, and other, kinds of cheating behavior, can be remediated, such as by isolating non-human players in their own match of a multiplayer video game.

It is to be appreciated that the machine learning model(s) 216 may be trained using additional data, in addition to, or in lieu of, the historical sensor data 604 mentioned above. For example, historical game control data 606 may be collected from client machines 104 over time, the game control data 606 having been generated based on user input that was provided by human users to handheld devices in order to control an aspect(s) of the video game 110. These user inputs may include actuation of a control on the handheld device 602, such as a press of a button, a deflection of a joystick, a swipe of a finger on a trackpad, etc., and/or a tilt or a movement of the handheld device 602 in 3D space. Accordingly, historical game control data 606 (e.g., data indicative of user input provided to the handheld device 602, such as to control an aspect(s) of a video game 110) may be used as training data, along with, or instead of using, the historical sensor data 604. Using both historical sensor data 604 and historical game control data 606 as training data allows for correlations to be made between game control data 606 and contemporaneously-generated sensor data 604. As yet another example, wireless communication data may be collected from client machines 104 over time, and the historical wireless communication data may be used as training data, along with, or instead of using, the historical sensor data 604. This wireless communication data can include, without limitation, a wireless (e.g., WiFi, Bluetooth, etc.) signal strength value(s), data indicating an instance(s) of dropped data packets sent from the handheld device 602 to an associated client machine 104, a number of dropped data packets sent from the handheld device 602 to an associated client machine 104, etc. This wireless communication data can be obtained by the handheld device 602, by the client machine 104, and/or any other suitable device that is local to the environment of the user 102.

As described above, the training data can include two components: features and labels. However, the training data used to train the machine learning model(s) 216 may be unlabeled, in some embodiments. Accordingly, the machine learning model(s) 216 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. Example features included in the training data may include, without limitation, sensor data 604 values (e.g., capacitance values, resistance values, displacement values, velocity values, acceleration values, temperature values, humidity values, etc.), game control data 606 values (e.g., values generated by potentiometers and other switches of finger-operated controls), biometric data values, private key 632 values associated with handheld devices 602 that used the private key 632 to encrypt data sent to the remote computing system 106, including an amount of time a private key 632 (and, therefore, a trusted handheld device 602) has been associated/registered with a user account 120, a number of times a trusted handheld device 602 (and/or its private key 632) has been used with a user account 120, wireless communication data values (e.g., wireless signal strength values, values indicating instances of dropped data packets sent from the handheld device 602 to an associated client machine 104, values indicating a number or frequency of dropped data packets sent from the handheld device 602 to an associated client machine 104, etc.), a number of times a trusted handheld device 602 (and/or its private key 632) has been switched between different user accounts 120, an amount of time a player spent playing video games 110 in general, an amount of time a player spent playing a particular video game 110, times of the day the player was logged in and playing video games 110, match history data for a player—e.g., total score (per match, per round, etc.), headshot percentage, kill count, death count, assist count, player rank, etc., a number and/or frequency of reports of a player cheating, a number and/or frequency of cheating acquittals for a player, a number and/or frequency of cheating convictions for a player, confidence values (score) output by a machine learning model that detected a player of cheat during a video game, a number of user accounts 120 associated with a single player (which may be deduced from a common address, phone number, payment instrument, etc. tied to multiple user accounts 120), how long a user account 120 has been registered with the video game service, a number of previously-banned user accounts 120 tied to a player, number and/or frequency of a player's monetary transactions on the video game platform, a dollar amount per transaction, a number of digital items of monetary value associated with a player's user account 120, number of times a user account 120 has changed hands (e.g., been transferred between different owners/players), a frequency at which a user account 120 is transferred between players, geographic locations from which a player has logged-in to the video game service, a number of different payment instruments, phone numbers, mailing addresses, etc. that have been associated with a user account 120 and/or how often these items have been changed, and/or any other suitable features that may be relevant in computing a trust score 118 that is indicative of a probability that game control data associated with a user account was generated by a handheld device 602 held and operated by a human player, as opposed to having been synthesized and/or modified using software.

As part of the training at Step 1 in FIG. 6, the training component 210 may set weights for machine learning. These weights may apply to a set of features included in the training data, as derived from the historical data in the datastore 116, including the historical sensor data 604. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the score 118 that is output by the trained machine learning model 216.

At Step 2 of FIG. 6, the computing system 106 may score one or more registered user accounts 120 using the trained machine learning model(s) 216. For example, the computing system 106 may receive new sensor data 604 and new game control data 606 associated with one or more logged-in, registered user accounts 120 from one or more client machines 104. In an illustrative example, the computing system 106 may receive information 122 indicating that a logged-in user account(s) 120 is/are currently playing, or have initiated, a video game 110. The video game 110 may be executing on a client machine(s) 104 via the installed client application, or the video game 110 may be streamed to the client machine(s) 104 while it is executing on the remote computing system 106. In any case, as players 102 login with their user accounts 120 and execute a particular video game 110, requesting to play in multiplayer mode, their respective client machines 104 may provide information 122 to the computing system 106 indicating as much, and sensor data 604 and game control data 606 may be streamed, in real-time, to the remote computing system 106 from the client machine(s) 104 as the video game 110 is initiated and the players begin gameplay. The computing system 106 may provide the new sensor data 604 it receives as input to the trained machine learning model(s) 216, and may generate, as output from the trained machine learning model(s) 216, scores 118 associated with individual user accounts 120 that are logged-in and associated with the new game control data 606. A score 118, in this example, may relate to the probability of the new game control data 606 having been generated by a handheld device 602 associated with the client machine. In this case, a high trust score indicates a trusted user account 120 (e.g., one that is likely associated with a human player operating a handheld device 602), whereas a low trust score indicates an untrusted user account 120 (e.g., one that is likely associated with a non-human player, such as software, generating synthesized and/or modified game control data 606 that looks similar to real game control data 606 generated by a real, handheld device 602). In some embodiments, the score 118 is a variable that is normalized in the range of [0,1]. This trust score 118 may have a monotonic relationship with a probability of the new game control data 606 having been generated by a handheld device 602. The relationship between the score 118 and the actual probability, while monotonic, may or may not be a linear relationship. Of course, the scoring can be implemented in any suitable manner to predict whether the new game control data 606 was generated by a handheld device 602, or synthesized and/or modified using software.

In some embodiments, the new game control data 606 itself may be provided as additional input to the trained machine learning model(s) 216 to generate the score 118 based at least in part on the game control data 606 provided as the additional input to the trained machine learning model(s) 216. For example, the user 102 may operate the handheld device 602 during gameplay by actuating a control (e.g., pressing a button, such as a directional pad (D-pad), deflecting a joystick, swiping a finger on a trackpad, etc.) of the handheld device 602, and/or by tilting or moving the handheld device 602 in 3D space to control an aspect(s) of the video game 110. In response to the user's operation of the handheld device 602, the handheld device 602 may generate game control data 606 that is sent to the remote computing system 106. This new game control data 606— which is indicative of the user input provided to the handheld device 602—may be provided as input to the trained machine learning model(s) 216. It is to be appreciated that the new game control data 606 may be provided as input to the trained machine learning model(s) 216 in addition to providing the sensor data 604 as input to the trained machine learning model(s) 216. An example reason for providing the game control data 606 as input to the trained machine learning model(s) 216 is that a human providing user input to the handheld device 602 may be "noisier" or not as clean as a computer program simulating the same type of user input. Thus, the trained machine learning model(s) 216 can be trained to distinguish between human users and non-human players (e.g., software designed to cheat) based at least in part on game control data 606 received from a client machine 104 and provided as input to the trained machine learning model(s) 216.

In some embodiments, new wireless communication data may be provided as additional input to the trained machine learning model(s) 216 to generate the score 118 based at least in part on the wireless communication data provided as the additional input to the trained machine learning model(s) 216. For example, a wireless (e.g., WiFi, Bluetooth, etc.) signal strength may be determined with respect to the handheld device 602 relative to another device with which it communicates, such as the client machine 104, and this signal strength may vary (e.g., increase or decrease) depending on interference of the wireless signal in the environment and/or the distance the handheld device 602 is spaced apart from another device with which it communicates. The existence of a wireless signal strength value, and/or a wireless signal strength that varies (e.g., observing changing signal strength values) over time may indicate that a human player is using a handheld device 602, because these characteristics are commonly encountered in gaming system setups. By contrast, the absence of a signal strength value, or a constant signal strength value that does not vary over time may be indicative of a non-human player (e.g., software designed to cheat). As another example, wireless communication data indicating an instance(s) of dropped data packets sent from the handheld device 602 to an associated client machine 104, and/or a number(s) of dropped data packets sent from the handheld device 602 to an associated client machine 104 may be determined and used as input to the trained machine learning model(s) 216. For instance, the existence of one or more dropped packets, and/or numbers of dropped data packets that vary over time may indicate that a human player is using a handheld device 602. By contrast, if there are no dropped packets in the wireless communication data, and/or if the number of dropped data packets remains constant (e.g., does not vary) over time, this may be indicative of a non-human player (e.g., software designed to cheat).

In some embodiments, determining the score 118 is further based on a determination that biometric data received from a client machine 104 and/or a private key 632 used to encrypt data received from a client machine 104 matches biometric data and/or one of a plurality of private keys maintained in a database 116, which are associated with a plurality of trusted handheld devices 602. That is biometric data and/or the private key 632 may be used as a proxy for trust to prove to the remote computing system 106 that a real, handheld controller 602 that is trusted by the system 106 is sending game control data 606.

At Step 3 in FIG. 6, with the machine-learned scores 118 determined for a logged-in, registered user account(s)s 120 based on new sensor data 604 received from a corresponding client machine 104, the computing system 106 may match players 102 together into multiple matches for playing the video game 110 in the multiplayer mode, and by providing match assignments 124 to the client machines 104 in order to assign subsets of the logged-in user accounts 120 to different ones of the multiple matches based at least in part on the machine-learned scores 118 that were determined for the logged-in user accounts 120. In this manner, if the trained machine learning model(s) 216 assigned low (e.g., below threshold) scores 118 to a first subset of the logged-in user accounts 120 and high (e.g., above threshold) scores 118 to a second subset of the logged-in user accounts 120, the first subset of the logged-in user accounts 120 may be assigned to a first match of the multiple matches, and the second subset of the logged-in user accounts 120 may be assigned to a second, different match of the multiple matches. This may include assigning user accounts 120 to matches at the beginning of a video game 110 (e.g., before a match is initiated), and/or reassigning user accounts 120 to new matches in the middle of a video game 110 (e.g., after a match has been initiated). For example, if a first logged-in user account 120 was initially assigned to a first match designated for human players 102, and subsequently, a machine-learned score 118 is generated for that user account 120 based on real-time data provided as input to a trained machine learning model(s) 216, the score 118 indicating that the first user account 120 is likely associated with a non-human player (e.g., software) that is synthesizing and/or modifying game control data 606, then the computing system 106 may reassign the first user account to a second match designated for non-human players 102 (e.g., cheating players who are using software to synthesize and/or modify game control data). In some embodiments, when a client machine 104 sends game control data 606 and does not send raw, unfiltered sensor data 604 along with the game control data 606, the user account 120 associated therewith may be considered untrusted based on the absence of raw sensor data 604. In other embodiments, the game control data 606 may be provided as input to the trained machine learning model(s) 216 to generate a score 118 for the user account, even in the absence of raw sensor data 604, or a machine-learned score 118 may be generated for such a user account 120 in any other suitable manner described herein to determine a cheating propensity of the player associated with the user account 120.

At Step 4 in FIG. 6, the computing system 106 may cause execution of the video game 110 in the assigned match for each user account 120. In a streaming implementation, this may involve the remote computing system 106 capturing the state of the video game 110 executing on the remote system 106, encoding the video and audio data into bits, transmitting the encoded bits to the client machine 104 over the computer network 108, and an application (e.g., a video game client) executing on the client machine 104 may decode the bits to output imagery via a display(s) and audio via a speaker(s) of (or via headphones connected to) the client machine 104 for a given frame. It is to be appreciated that the computer network 108 of FIG. 1 may, in some embodiments, represent a local area network (LAN), which may be the case in an "in-home" video game streaming scenario. In this scenario, the computing system 106 may represent a host computing system that is located in, or near, the same geographical location of the client machines 104. In either a wide area network (WAN) or a LAN implementation, the client machines 104 may be implemented as thin-clients that are configured to send and receive data to and from the computing system 106 with minimal data processing on the client machine 104 itself (e.g., without having to execute a video game 110 on the client machine 104 itself). In a thin-client implementation, game control data 606 and sensor data 604 may be received the computing system 106, and the computing system 106 may send frames of image data and audio data to the client machine 104 for presentation on a display associated with the client machine 104. In an implementation where the client applications on each machine 104 are executing the video game 110, information may be sent to each client application executing on a client machine 104 at Step 4 to cause execution of the video game 110 on the client machines 104 in the assigned match for the logged-in user account 120 in question. With players grouped into matches based at least in part on the machine-learned scores 118, the in-game experience may be improved for at least some of the groups of players 102 because the system may group players predicted to behave badly (e.g., by cheating)—including non-human players (e.g., software designed to cheat)—together in the same match, and by doing so, may keep the bad-behaving players isolated from other players who want to play the video game 110 legitimately.

Figure 7:
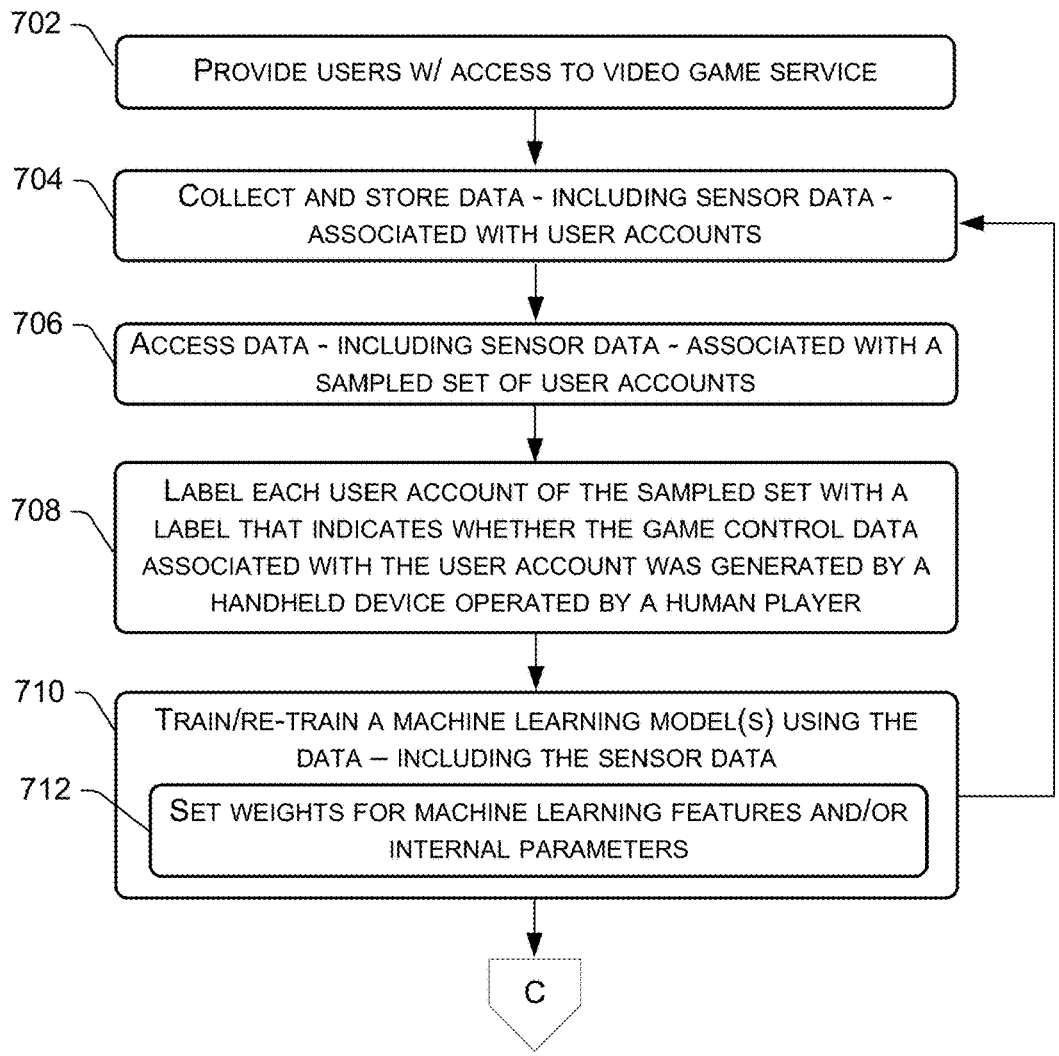
FIG. 7 is a flow diagram of an example process for training a machine learning model(s) using data that includes sensor data in order to predict a probability of game control data received from a client machine having been generated by a handheld device.

FIG. 7 is a flow diagram of an example process 700 for training a machine learning model(s) 216 using data that includes sensor data 604 in order to predict a probability of game control data 606 received from a client machine 104 having been generated by a handheld device 602. For discussion purposes, the process 700 is described with reference to the previous figures.

At 702, a computing system 106 may provide users 102 with access to a video game service. For example, the computing system 106 may allow users to access and browse a catalogue of video games 110, modify user profiles, conduct transactions, engage in social media activity, and other similar actions. The computing system 106 may distribute video games 110 (and content thereof) to client machines 104 as part of the video game service. In an illustrative example, a user 102 with access to the video game service can load an installed client application, login with a registered user account, select a desired video game 110, and execute the video game 110 on his/her client machine 104 via the client application, by streaming the video game 110, downloading the video game 110 and executing the game locally on the client machine 104, or any other suitable game distribution/execution platform.

At 704, the computing system 106 may collect and store data associated with user accounts 120 that are registered with the video game service. This data may include at least the sensor data 604 described herein, but it may also include the data 114 and the game control data 606 described herein, as well. The data may be collected at block 704 at any suitable time, such as when users 102 access the video game service with their registered user accounts 120 and use this video game platform, such as to play video games 110 thereon. Data generated locally at client machines 104 and/or by handheld devices 602 may be collected in real-time, as the data is generated (e.g., by receiving real-time, streamed data from client machines 104), received at defined intervals, and/or in response to events (e.g., when a user account 120 exits a video game, when network bandwidth is sufficient for sending data, etc.). Over time, one can appreciate that a large collection of data tied to registered user accounts 120 may be available to the computing system 106.

At 706, the computing system 106, via the training component 210, may access (historical) data, including (historical) sensor data 604, associated with a sampled set of user accounts 120 registered with the video game service. The (historical) sensor data 604 may have been received from client machines 104 along with (historical) game control data 606 that was processed by a video game 110 at the time the game control data 606 was received, such as to control an aspect(s) of the video game 110. Therefore, the (historical) sensor data 604 may be correlated with corresponding (historical) game control data 606 that was contemporaneously generated. In an example, the sensor data 604 accessed at block 706 may include raw sensor data 604 that was generated by one or more physical sensors 610 of handheld devices 602 as users 102 operated those handheld devices 602 to play video games 110 on the video game platform.

At 708, the computing system 106, via the training component 210, may label each user account 120 of the sampled set of user accounts 120 with a label that indicates whether the (historical) game control data 606 associated with the user account 120 was generated by a handheld device 602 while a human player held and operated the device 602 to generate the (historical) game control data 606 associated with the user account 120.

At 710, the computing system 106, via the training component 210, may train a machine learning model(s) 216 using the (historical) sensor data 604, and possibly additional data (e.g., (historical) game control data 606, (historical) wireless communication data, etc.) as described herein, as training data to obtain the trained machine learning model(s) 216. As shown by sub-block 712, the training of the machine learning model(s) 216 at block 710 may include setting weights for machine learning. These weights may apply to a set of features derived from the historical sensor data 604. In some embodiments, the weights set at block 712 may apply to parameters that are internal to the machine learning model(s) (e.g., weights for neurons in a hidden-layer of a neural network). These internal parameters of the machine learning model(s) 216 may or may not map one-to-one with individual input features of the set of features. As shown by the arrow from block 710 to block 704, the machine learning model(s) 216 can be retrained using updated (historical) data, including updated (historical) sensor data 604, to obtain a newly trained machine learning model(s) 216 that is adapted to recent player behaviors. This allows the machine learning model(s) 216 to adapt automatically, over time, to changing player behaviors.

Figure 8:
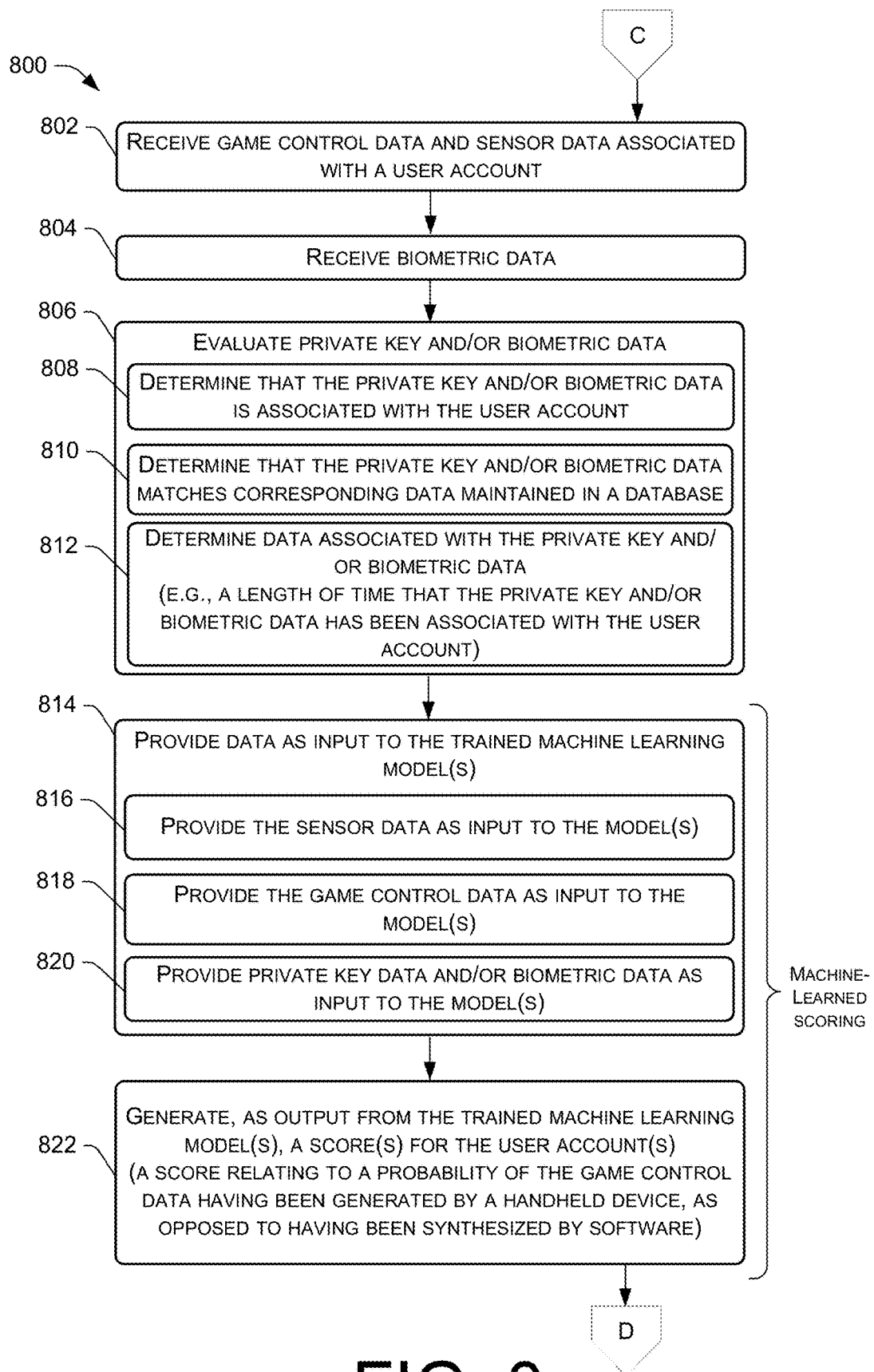
FIG. 8 is a flow diagram of an example process for utilizing a trained machine learning model(s) to determine trust scores for user accounts, the trust scores relating to probabilities of game control data having been generated by a handheld device.

FIG. 8 is a flow diagram of an example process 800 for utilizing a trained machine learning model(s) 216 to determine trust scores for user accounts, the trust scores relating to probabilities of game control data 606 having been generated by a handheld device 602. For discussion purposes, the process 800 is described with reference to the previous figures. Furthermore, as indicated by the off-page reference "C" in FIGS. 7 and 8, the process 800 may continue from block 710 of the process 700.

At 802, the computing system 106 may receive game control data 606 and sensor data 604 from a client machine(s) 104. The game control data 606 and the sensor data 604 may be associated with a user account(s) 120 that is/are logged into a video game service and registered therewith. The game control data 606 may be data that is to be processed by a video game 110 for controlling an aspect(s) of the video game 110. The sensor data 604 received at block 802 may include, without limitation, capacitance values, resistance values, displacement values, velocity values, acceleration values, temperature values, humidity values, etc. In some embodiments, these values represent raw (e.g., unfiltered, unamplified) values, assuming they are generated by an actual, physical sensor 610 of a handheld device 602. Furthermore, some or all of the data received at block 802 may be encrypted (e.g., the device 602 may have used the private key 632 to encrypt the data before sending the data to the remote system 106).

At 804, the computing system 106 may further receive biometric data from the client machine(s) 104. For example, an input device of the handheld device 602 (e.g., a touch sensor, camera, microphone, etc.) may obtain biometric data from a user of the handheld device 602, and the handheld device 602 may transmit the obtained biometric data to the client machine 104, and the client machine 104 may forward the biometric data to the remote computing system 106 over the computer network 108. This biometric data may be received as encrypted data as well (e.g., the device 602 may have used the private key 632 to encrypt the biometric data before sending the data to the remote system 106).

At 806, the computing system 106 may evaluate the private key 632 and/or the biometric data. As shown by sub-blocks 808, 810, and 812, this evaluation can include various operations. For example, the remote system 106 may decrypt any encrypted data that was received at block 802 and/or 804 to verify that the expected private key 632 was used to encrypt the received data. At sub-block 808, the computing system 106 may determine that the biometric data and/or private key 632 is associated with the user account 120 associated with the game control data 606 and the sensor data 604 received at block 802. This may be determined by comparing the biometric data to biometric data that has been associated with user accounts 120 and/or by determining that the encrypted data was in fact encrypted using a private key(s) 632 that has/have been associated with user accounts 120.

At sub-block 810, the computing system 106 may determine that the biometric data matches biometric data maintained in the database 116 and/or that the private key 632 matches one of a plurality of private keys maintained in a database 116. The biometric data and/or private keys maintained in the database 116 may be associated with a plurality of trusted handheld devices 602, such that, if the private key 632 derived from the encrypted data matches one of the private keys in the database 116 and/or if the received biometric data matches any of the biometric data in the database 116, the computing system 106 can use that matching data as a proxy for trust, knowing that it was sent from a trusted handheld device 602.

At sub-block 812, the computing system 106 may determine data associated with the biometric data and/or the private key 632. For example, the computing system 106 may determine a length of time that the biometric data and/or the private key 632 has been associated with the user account 120. The computing system 106 may additionally, or alternatively, determine a number of times the biometric data and/or the private key 632 has been used with, or used to login to, a user account 120. The computing system 106 may additionally, or alternatively, determine a number of times the private key 632 has been switched between different user accounts 120, such as by being dissociated/unregistered from a first user account 120 and subsequently associated/registered with a second user account 120.

At 814, the computing system 106, via the scoring component 212, may provide data as input to the trained machine learning model(s) 216. As shown by sub-blocks 816, 818, and 820, in some embodiments, this can involve providing various types of data as input to the trained machine learning model(s) 216 at block 806. For example, at sub-block 816, the sensor data 604 received at block 802 may be provided as input to the trained machine learning model(s) 216. At sub-block 818, the game control data 606 received at block 802 may be provided as additional input to the trained machine learning model(s) 216. At sub-block 820, private key 632 data and/or biometric data may be provided as yet additional input to the trained machine learning model(s) 216, such as the value of the private key 632 and/or any of the data determined at sub-block 812. In some embodiments, wireless communication data (e.g., wireless signal strength data, data relating to dropped data packets, etc.) may be provided as input to the trained machine learning model(s) 216 at block 814. In some embodiments, the data 114, as described herein, may be provided as input to the trained machine learning model(s) 216 at block 814. In general, any quantifiable data that was included in a set of features used to train the machine learning model(s) 216, as described herein, can be provided as input to the trained machine learning model(s) 216. In embodiments where the sensor data 604 is provided as the input data to the model(s) 216, the sensor data 604 constitutes an unknown input that is used to score the user account 120 in question.

At 822, the computing system 106, via the scoring component 212, may generate, as output from the trained machine learning model(s) 216, trust scores 118 associated with the user account(s) 120 associated with the game control data 606 that was received at block 802. A score 118 relates to a probability of the game control data 606 having been generated by a handheld device 602 associated with the client machine 104 that sent the game control data 606 to the remote computing system 106. This score 118 can also be thought of as relating to a probability of the game control data 606 having been "human-generated," as opposed to having been synthesized and/or modified by software (e.g., an aimbot). Because of the various types of data that can be input to the trained machine learning model(s) 216 to generate the score 118, determining the score 118 can be based at least in part on the sensor data 604, based at least in part on the game control data 606, based at least in part on determining that the private key matches a private key in the database 116, and/or based at least in part on the length of time that the private key 632 has been associated with the user account 120, and so on. In some embodiments, the score 118 is a variable that is normalized in the range of [0,1]. This trust score 118 may have a monotonic relationship with a probability of the game control data 606 having been generated by a handheld device 602. The relationship between the score 118 and the actual probability associated with the particular behavior, while monotonic, may or may not be a linear relationship.

Thus, the process 800 represents a machine-learned scoring approach, where scores 118 (e.g., trust scores 118) are determined for user accounts 120, the scores indicating the probability of game control data 606 having been generated by a handheld device 602. Thus, the trust score 118 generated in the process 800 can be indicative of the probability of a player engaging in non-cheating behavior by virtue of using a real, handheld device 602 to play a video game 110. Use of a machine-learning model(s) 216 in this scoring process allows for distinguishing between human players and non-human players (e.g., software designed to cheat).

Figure 9:
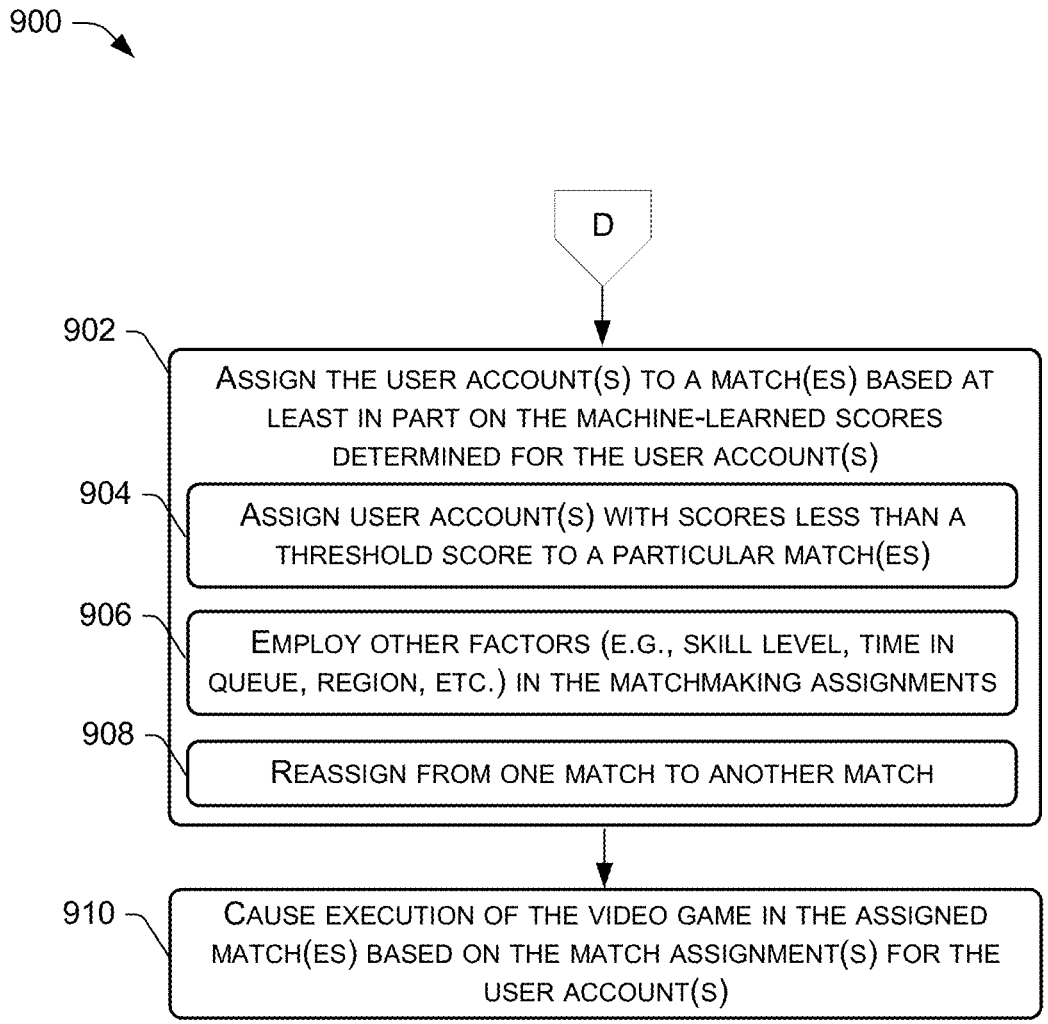
FIG. 9 is a flow diagram of an example process for assigning user accounts to different matches of a multiplayer video game based on machine-learned trust scores that relate to probabilities of game control data having been generated by a handheld device.

FIG. 9 is a flow diagram of an example process 900 for assigning user accounts 120 to different matches of a multiplayer video game 110 based on machine-learned trust scores 118 that relate to probabilities of game control data 606 having been generated by a handheld device 602. For discussion purposes, the process 900 is described with reference to the previous figures. Furthermore, as indicated by the off-page reference "D" in FIGS. 8 and 9, the process 900 may continue from block 822 of the process 800.

At 902, for a logged-in user account(s) 120 that has/have been scored according to the process 800, the computing system 106, via the matchmaking component 214, may assign a logged-in user account(s) 120 to an assigned match 218 of multiple matches 218, the assigning based at least in part on the machine-learned score(s) 118 generated for, and associated with, the user account(s) 120. The multiple matches 218 may include at least one match 218(1) designated for human players, and a second match 218(2) designated for non-human players, such as those that use software to synthesize and/or modify game control data 606. As mentioned, any number of matches can be defined such that further breakdowns and additional matches can be assigned to user accounts 120 at block 902. For example, the computing system 106, via the matchmaking component 214, may define any suitable number of matches into which players 102 are to be grouped for playing the video game 110 in the multiplayer mode, depending on various factors, including demand, capacity, and other factors that play into the matchmaking process.

As shown by sub-block 904, the assignment of the user accounts 120 to the assigned match(es) may be based on a threshold score. For instance, the matchmaking component 214 may determine that the score(s) 118 associated with the logged-in user account(s) 120 is/are less than a threshold score and may assign the logged-in user account(s) 120 to the second match 218(2) designated for non-human players based on the score(s) being less than the threshold score. Similarly, the matchmaking component 214 may determine that the scores 118 associated with the logged-in user account(s) 120 is/are equal to or greater than the threshold score and may assign the logged-in user account(s) 120 to the first match 218(1) designated for human players based on the score(s) being equal to or greater than the threshold score. This is merely one example way of providing match assignments 124, however, and other techniques are contemplated. For instance, clustering algorithms, or other statistical approaches may be used in addition, or as an alternative, to the use of a threshold score. In an example, the trust scores 118 may be used to preferentially match user accounts (players) with "similar" trust scores together. Given a natural tendency of the distribution of trust scores 118 to be largely bimodal across a plurality of user accounts 120, grouping trust scores 118 together based on a similarity metric (e.g., a distance metric, a variance metric, etc.) may provide similar results to that of using a threshold score. However, the use of a similarity metric to match user accounts together in groups for matchmaking purposes may be useful in instances where the matchmaking pool is small (e.g., players in a small geographic region who want to play less popular game modes) because it can provide a more fine-grained approach that allows for progressive tuning of the relative importance of the trust score versus other matchmaking factors, like skill level. In some embodiments, multiple thresholds may be used to "bucketize" user accounts 120 into multiple different matches.

As shown by sub-block 906, other factors besides the trust score 118 can be considered in the matchmaking assignment(s) at block 902. For example, the match assignment(s) 124 determined at block 902 may be further based on skill levels of players associated with the logged-in user accounts, amounts of time the logged-in user accounts have been waiting to be placed into one of the multiple matches, geographic regions associated with the logged-in user accounts, and/or other factors.

As shown by sub-block 908, the assignment operation at block 902 may include a reassignment operation where a user account 120 presently assigned to a first match 218(1) is reassigned to a second match 218(2), or vice versa. For example, the reassignment at sub-block 908 may include removing the user account(s) 120 from a first match 218 and reassigning the user account(s) 120 to a second match 218, based on the trust score(s) 118 generated for the user account(s) 120. This means that trust scoring 118 can occur at runtime, while a video game is being played, and players may be reassigned in the midst of playing a game if it is predicted, with reasonably high probability based on the machine-learned trust score(s) 118, that a player(s) is cheating (e.g., using "aimbot" software). Thus, although match assignments can be made based on machine-learned trust scores 118 before a multiplayer video game 110 starts, the computing system 106 can, at any suitable time during gameplay, re-generate trust scores 118 to determine if players are to be reassigned to a different match or not.

At 910, the computing system 106 may cause execution of the video game 110 in the assigned match(es) (e.g., one of the first match 218(1) or the second match 218(2)) for the logged-in user account(s) 120 that is associated with client machine 104 being utilized to play the video game 110. For example, the computing system 106 may cause execution of the video game 110 in the first match 218(1) for a first user account 120(1) associated with a first trust score 118(1), and may cause execution of the video game 110 in the second match 218(2) for a second user account 120(2) associated with a second trust score 118(2). In a streaming implementation, the video game 110 may be executed on the remote computing system 106 at block 910, and streamed to a client machine(s) 104. In other implementations, the remote computing system 106 may provide control instructions to a client application(s) executing the video game 110 on a client machine(s) 104 to execute the video game 110 in the assigned match(es).

Because machine-learned trust scores 118 are used as a factor in the matchmaking process, an improved gaming experience may be provided to users who desire to play a video game in multiplayer mode in the manner it was meant to be played. This is because the techniques and systems described herein can be used to match together players (e.g., non-human players) who are likely to behave badly (e.g., cheat by synthesizing and/or modifying game control data 606 using software), and to isolate those players from other trusted players who are likely to play the video game legitimately.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer executable instructions that, when executed by one or more processors, cause performance of operations comprising:
receiving game control data and sensor data from a client machine, the game control data and the sensor data associated with a user account that is registered with a video game service, wherein at least one of the game control data or the sensor data is received as encrypted data;
determining private key data associated with a private key that was used to encrypt the encrypted data, the private key data comprising at least one of:
a length of time that the private key has been associated with the user account;
a number of times the private key has been used with, or used to login to, the user account; or
a number of times the private key has been switched between different users accounts;
providing the sensor data and the private key data as input to a trained machine learning model;

generating, as output from the trained machine learning model, a trust score associated with the user account, the trust score relating to a probability that the game control data was generated by a handheld game controller associated with the client machine;

assigning, based at least in part on the trust score, the user account to an assigned match of multiple matches for playing a video game in multiplayer mode, the multiple matches including at least a first match designated for human players and a second match designated for non-human players that use software to generate synthesized or modified game control data; and causing execution of the video game in the assigned match for the user account.

2. The one or more non-transitory computer-readable media of claim 1, wherein the sensor data comprises raw sensor data generated by one or more physical sensors of the handheld game controller, and wherein the assigned match is the first match designated for the human players.

3. The one or more non-transitory computer-readable media of claim 1, the operations further comprising:

decrypting the encrypted data;

determining that the private key is associated with the user account; and determining that the private key matches one of a plurality of private keys maintained in a database, the plurality of private keys associated with a plurality of trusted handheld game controllers, wherein the generating of the trust score is further based on the determining that the private key matches the one of the plurality of private keys.

4. The one or more non-transitory computer-readable media of claim 1, wherein the assigning of the user account to the assigned match comprises:

removing the user account from the first match; and
reassigning the user account to the second match.

5. A method, comprising:

receiving, by a computing system, game control data and sensor data from a client machine, wherein the game control data and the sensor data are associated with a user account that is logged into a video game service, wherein the game control data is to be processed by a video game for controlling an aspect of the video game, and wherein at least one of the game control data or the sensor data is received as encrypted data;

determining private key data associated with a private key that was used to encrypt the encrypted data, the private key data comprising at least one of:

a length of time that the private key has been associated with the user account;

a number of times the private key has been used with, or used to login to, the user account; or a number of times the private key has been switched between different users accounts;

determining, by a computing system, a score associated with the user account by:

providing the sensor data and the private key data as input to a trained machine learning model; and generating the score as output from the trained machine learning model, the score indicative of a probability of the game control data having been generated by a handheld device associated with the client machine;

assigning, based at least in part on the score, the user account to an assigned match of multiple matches, the assigned match comprising at least one of a first match or a second match;

causing, by the computing system, execution of the video game for the user account in the assigned match.

6. The method of claim 5, wherein the sensor data comprises raw sensor data generated by one or more physical sensors of the handheld device.

7. The method of claim 6, wherein the raw sensor data comprises at least one of raw gyroscope data, raw accelerometer data, or raw capacitive sensor data.

8. The method of claim 6, wherein the handheld device is a handheld game controller.

9. The method of claim 5, further comprising, prior to the determining of the score:

accessing, by the computing system, historical sensor data associated with a sampled set of user accounts registered with the video game service, the historical sensor data having been received from client machines along with historical game control data processed by the video game, or a different video game, to control an aspect of the video game, or the different video game;

labeling each user account of the sampled set of user accounts with a label that indicates whether the historical game control data associated with the user account was generated by a handheld device while a human player held and operated the handheld device to generate the historical game control data associated with the user account; and training a machine learning model using the historical sensor data as training data to obtain the trained machine learning model.

10. The method of claim 9, wherein the training of the machine learning model comprises setting weights for at least one of a set of features derived from the historical sensor data or parameters internal to the machine learning model.

11. The method of claim 5, wherein the determining of the score further comprises:

providing the game control data as additional input to the trained machine learning model in addition to the providing of the sensor data and the private key data as the input to the trained machine learning model, wherein the score is generated based at least in part on the game control data provided as the additional input to the trained machine learning model.

12. The method of claim 5, further comprising:

decrypting, by the computing system, the encrypted data;

determining, by the computing system, that the private key is associated with the user account; and determining, by the computing system, that the private key matches one of a plurality of private keys maintained in a database, the plurality of private keys associated with a plurality of trusted handheld devices, wherein the determining of the score is further based on the determining that the private key matches the one of the plurality of private keys.

13. The method of claim 5, wherein the assigning of the user account to the at least one of the first match or the second match based at least in part on the score comprises determining whether the score satisfies a threshold score.

14. A system, comprising:

one or more processors; and memory storing computer-executable instructions that, when executed by the one or more processors, cause the system to:

receive game control data and sensor data from a plurality of client machines, wherein the game control data and the sensor data are associated with logged-in user accounts of a plurality of user accounts registered with a video game service, wherein the game control data is to be processed by a video game for controlling one or more aspects of the video game, and wherein at least one of the game control data or the sensor data is received as encrypted data;

determine private key data associated with private keys that were used to encrypt the encrypted data, the private key data comprising at least one of:
  lengths of time that the private keys have been associated with respective ones of the logged-in user accounts;
  numbers of times the private keys have been used with, or used to login to, the respective ones of the logged-in user accounts; or
  numbers of times the private keys have been switched between different users accounts;

determine scores for the logged-in user accounts, wherein individual ones of the scores are determined by:
  providing the sensor data and the private key data associated with an individual user account as input to a trained machine learning model; and
  generating, as output from the trained machine learning model, a score associated with the individual user account, the score relating to a probability that the game control data associated with the individual user account was generated by a handheld device associated with a client machine of the plurality of client machines;

assign, based at least in part on the scores determined for the logged-in user accounts, a first subset of the logged-in user accounts to a first match and a second subset of the logged-in user accounts to a second match; and cause execution of the video game in the first match for the first subset of the logged-in user accounts and in the second match for the second subset of the logged-in user accounts.

15. The system claim 14, wherein the sensor data associated with the first subset of the logged-in user accounts comprises raw sensor data generated by one or more physical sensors of handheld devices.

16. The system of claim 15, wherein the raw sensor data comprises at least one of raw gyroscope data, raw accelerometer data, or raw capacitive sensor data.

17. The system of claim 14, wherein the individual ones of the scores are further determined by:
  providing the game control data associated with the individual user account as additional input to the trained machine learning model in addition to the providing of the sensor data and the private key data associated with the individual user account as the input to the trained machine learning model,
  wherein the score associated with the individual user account is generated based at least in part on the game control data associated with the individual user account provided as the additional input to the trained machine learning model.

18. The system of claim 14, wherein the computer-executable instructions, when executed by the one or more processors, further cause the system to:
  decrypt the encrypted data;
  determine that a private key used to encrypt the encrypted data is associated with one of the logged-in user accounts; and
  determine that the private key matches one of a plurality of private keys maintained in a database, the plurality of private keys associated with a plurality of trusted handheld devices,
  wherein an individual score associated with the one of the logged-in user accounts is further determined based on determining that the private key matches the one of the plurality of private keys.

19. The system of claim 14, wherein the individual ones of the scores are further determined by:
  providing wireless communication data associated with the individual user account as additional input to the trained machine learning model in addition to the providing of the sensor data and the private key data associated with the individual user account as the input to the trained machine learning model, the wireless communication data indicating at least one of a wireless signal strength associated with the handheld device or one or more instances of dropped data packets sent from the handheld device,
  wherein the score associated with the individual user account is generated based at least in part on the wireless communication data associated with the individual user account provided as the additional input to the trained machine learning model.

20. The method of claim 5, wherein the determining of the score further comprises:
  providing wireless communication data as additional input to the trained machine learning model in addition to the providing of the sensor data and the private key data as the input to the trained machine learning model, the wireless communication data indicating at least one of a wireless signal strength associated with the handheld device or one or more instances of dropped data packets sent from the handheld device,
  wherein the score is generated based at least in part on the wireless communication data provided as the additional input to the trained machine learning model.

* * * * *